(12) United States Patent
Pohl et al.

(10) Patent No.: US 11,325,452 B2
(45) Date of Patent: May 10, 2022

(54) BATTERY HOLDER FOR A VEHICLE

(71) Applicant: Benteler Automobiltechnik GmbH, Paderborn (DE)

(72) Inventors: Martin Pohl, Altenbeken (DE); Christian Handing, Langenberg (DE); Frank Rabe, Hiddenhausen (DE); Tobias Duepmeier, Paderborn (DE); Konstantin Tatarinov, Bielefeld (DE); Edvin List Clausen, Løjt Kirkeby Abenra (DK)

(73) Assignee: Benteler Automobiltechnik GmbH, Paderborn (DE)

( * ) Notice: Subject to any disclaimer, the term of this patent is extended or adjusted under 35 U.S.C. 154(b) by 351 days.

(21) Appl. No.: 15/849,280

(22) Filed: Dec. 20, 2017

(65) Prior Publication Data

US 2018/0215282 A1 Aug. 2, 2018

(30) Foreign Application Priority Data

Dec. 23, 2016 (DE) ...................... 10 2016 125 697.8

(51) Int. Cl.
*B60K 1/04* (2019.01)
*H01M 10/6556* (2014.01)
(Continued)

(52) U.S. Cl.
CPC ................ *B60K 1/04* (2013.01); *B60L 50/66* (2019.02); *B60L 58/26* (2019.02); *B60L 58/27* (2019.02); *H01M 10/613* (2015.04); *H01M 10/615* (2015.04); *H01M 10/6556* (2015.04); *H01M 50/20* (2021.01); *B62D 29/008* (2013.01);
(Continued)

(58) Field of Classification Search
CPC ............. H01M 10/625; H01M 10/613; H01M 10/615; H01M 10/6556; H01M 2220/20; H01M 2/1077; H01M 2/1083; H01M 2/10; B60K 1/04; B60L 11/1874; B60L 11/1875; B60L 11/1877; B60L 50/66; B60L 58/26; B60L 58/27; B62D 29/008; Y02T 10/7005
See application file for complete search history.

(56) References Cited

U.S. PATENT DOCUMENTS

2006/0078789 A1* 4/2006 Wegner ............... H01M 10/625
429/120
2011/0206967 A1* 8/2011 Itsuki ..................... B60L 50/64
429/120
(Continued)

FOREIGN PATENT DOCUMENTS

CN 102884673 A 1/2013
CN 104303359 A 1/2015
(Continued)

*Primary Examiner* — Adam A Arciero
(74) *Attorney, Agent, or Firm* — Holland & Hart LLP

(57) ABSTRACT

The disclosure relates to a battery holder for the receiving of a plurality of battery modules in an electrically driven vehicle. The battery holder may include a plurality of juxtaposed module receptacles, wherein each module receptacle is configured to receive the battery module, and a profile wall that defines the plurality of module receptacles, wherein a heat exchanger is configured to temper the battery modules is formed in the side wall, wherein the heat exchanger comprises a plurality of hollow channels that extend along the module receptacles.

14 Claims, 34 Drawing Sheets

(51) Int. Cl.
*B60L 58/26* (2019.01)
*B60L 50/60* (2019.01)
*B60L 58/27* (2019.01)
*H01M 50/20* (2021.01)
*H01M 10/613* (2014.01)
*H01M 10/615* (2014.01)
*H01M 10/625* (2014.01)
*B62D 29/00* (2006.01)

(52) U.S. Cl.
CPC ...... *H01M 10/625* (2015.04); *H01M 2220/20* (2013.01); *Y02T 10/70* (2013.01)

(56) References Cited

U.S. PATENT DOCUMENTS

| | | | | |
|---|---|---|---|---|
| 2012/0224326 | A1* | 9/2012 | Kohlberger | H01M 10/625 361/699 |
| 2013/0045410 | A1* | 2/2013 | Yang | H01M 10/625 429/120 |
| 2013/0059185 | A1* | 3/2013 | Whitacre | H01M 12/005 429/99 |
| 2015/0144314 | A1* | 5/2015 | Srinivassan | F16L 13/08 165/168 |
| 2015/0171486 | A1* | 6/2015 | Rawlinson | H01M 10/482 324/426 |
| 2015/0303537 | A1* | 10/2015 | Jung | F28F 3/12 429/120 |
| 2016/0254515 | A1* | 9/2016 | Shimoda | H01M 2/206 429/61 |

FOREIGN PATENT DOCUMENTS

| | | |
|---|---|---|
| CN | 104733795 A | 6/2015 |
| CN | 105684186 A | 6/2016 |
| DE | 10 2012 109 728 A1 | 4/2014 |
| JP | 08058617 A | 3/1996 |

* cited by examiner

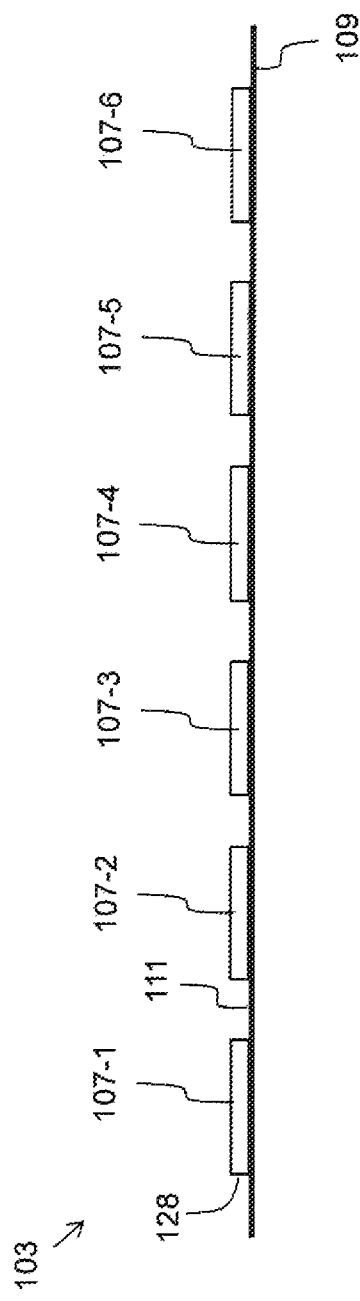

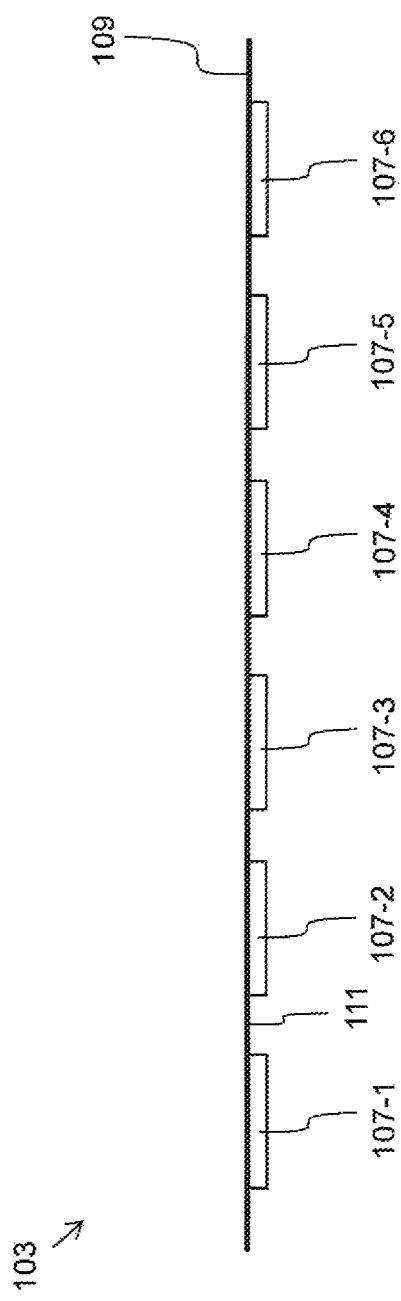

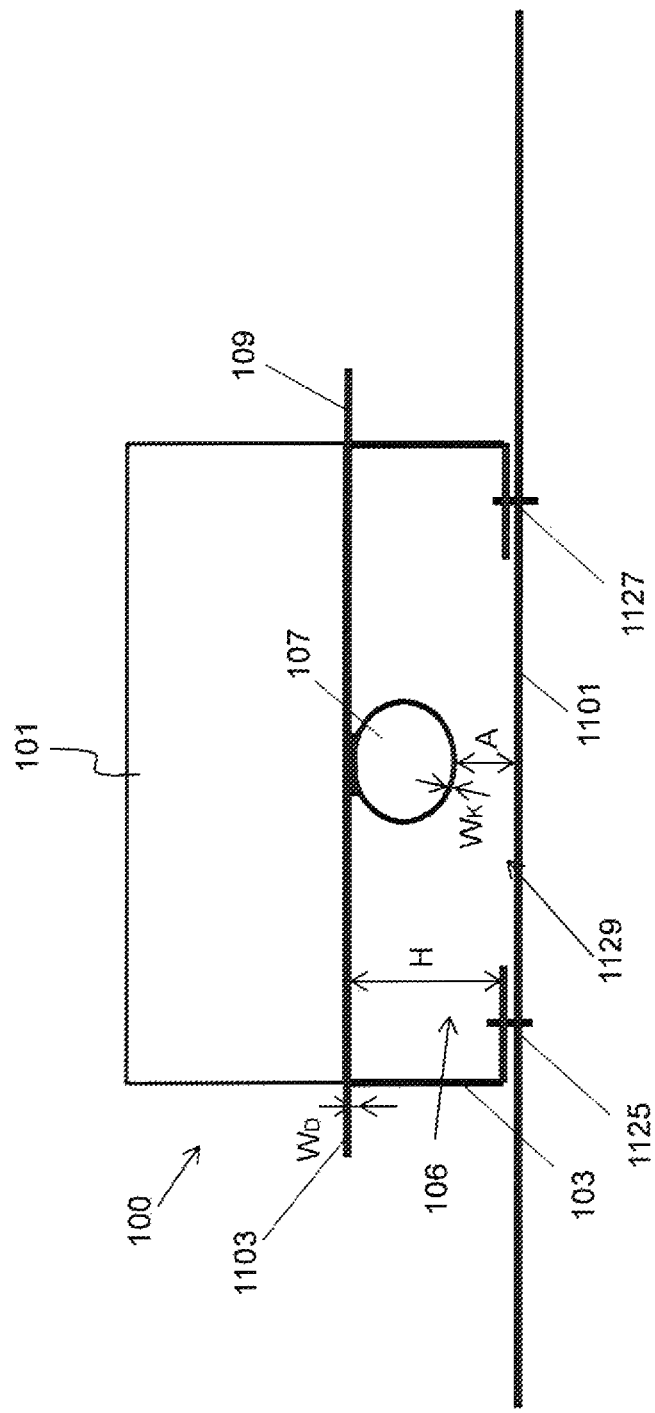

BATTERY HOLDER FOR A VEHICLE

CROSS-REFERENCE TO RELATED APPLICATIONS

This application claims priority to German patent application No. 10 2016 125 697.8, entitled "Batteriehalterung für ein Fahrzeug", and filed on Dec. 23, 2016 by the assignee of this application, the entire disclosure of which is incorporated by reference for all purposes.

BACKGROUND

The present disclosure relates to a battery holder for the receiving of a plurality of battery modules in a vehicle, especially an electrically driven vehicle.

For supporting of battery modules for the providing of electrical energy in electrically driven vehicles typically battery holders are used, which are disposed between the axles of the vehicle.

For the efficient production of such battery holders profile elements can be used, which are described in the printed publication DE 10 2012 100 977 B3.

SUMMARY

It is the object of the present disclosure to provide an additional efficient battery holder.

This object is achieved by the features of the independent claims. Advantageous examples are subject of the dependent claims, the description as well as the attached drawings.

The present disclosure is based on the knowledge that the above object can be achieved by a battery holder, which as a functional component comprises an additional integrated functionality, which exceeds the holding of battery modules. Such a functionality is the tempering of the battery modules, especially the cooling and/or heating of the battery modules.

In this way the use of separate function components can be foregone, whereby the manufacturing costs can be decreased.

According to a first aspect the disclosure relates to a battery holder for the receiving of a plurality of battery modules in an electrically driven vehicle, comprising a plurality of juxtaposed module receptacles, wherein each module receptacle is provided for the receiving of the battery module; and a profile wall, which defines the plurality of module receptacles, wherein a heat exchanger for the tempering of the battery modules is formed in the profile wall, wherein the heat exchanger comprises a plurality of hollow channels, which extend along the module receptacles.

In an example the battery holder is closable in a fluid-tight, especially gas-tight or water-tight manner. The fluid-tight seal may be achieved by means of a lid, which may be integrally joined to the unsealed battery holder after the battery modules have been inserted in the module receptacles.

The profile wall can form a bottom of the battery holder and thereby form the plurality of the module receptacles. In this case the module receptacles are separated from each other by walls and either form insertion cavities or recesses and/or receiving spaces for the battery modules. Thereby, a module receptacle can be provided for a single battery module or for multiple battery modules. The walls can be realized by separating webs or separating walls, which rest on the profile wall or contact the profile wall or are integrally joined to the profile wall. The separating webs or separating walls can be connected to one another.

In an example the profile wall can form a side wall of the battery holder. In this case a base plate can be provided, which forms the bottom of the battery holder and thereby the module receptacles. The module receptacles are separated from each other by walls and either form insertion cavities or recesses and/or receiving spaces for the battery modules. Thereby, a module receptacle can be provided for a single battery module or for multiple battery modules. The walls can be realized by separating webs or separating walls, which are integrally joined to the profile wall. But it is also possible that the separating webs or separating walls are indirectly joined to the profile wall, for example, by coupling pieces.

In an example in the case of separately formed frame/side walls with the circumferential frame/side walls, which form the outer walls of the battery holder, the separating walls are joined in a fluid-tight manner.

In an example the module receptacles can be formed by base recesses in the base plate of the battery holder. Thereby, an additional protective plate can be provided underneath the base plate as an underrun protection device.

In an example the battery holder can comprise multiple profile walls with an integrated heat exchanger, which are formed as a base plate and side wall or as a base plate and one or more separating walls between the module receptacles.

In an example the profile wall is angled in longitudinal direction and simultaneously forms a base wall and a side wall or base wall and a separating wall of the battery holder. Thereby, multiple profile walls are integrally joined to each other and receive the plurality of battery modules. The module receptacles are preferably formed by separating walls and the base wall as well as the external circumferential side wall.

The tempering can comprise cooling and/or heating. The heat exchanger can be part of a cooling circuit or a heating circuit.

The module receptacles or battery modules can be separated from each other by separating walls or separating webs, so that each module receptacle forms an insert niche for the receiving of a battery module.

The battery modules preferably are solid or liquid energy storage devices. A battery module can comprise multiple with each other battery modules as well as electric connecting poles.

The battery holder can be installed longitudinally or laterally between the axles of the vehicle.

In an example the hollow channels are formed as hollow chambers in the profile wall.

In an example the profile wall is, especially integrally, formed by an extrusion profile. Thereby, the profile wall can be realized by a light metal profile.

In an example the profile wall comprises lateral hollow channel openings, wherein two opposing hollow channel openings respectively define one hollow channel, and wherein the lateral hollow channel openings of adjacent hollow channels are fluidly connected to each other in series or in parallel, especially in a fluid-tight manner.

The hollow channel openings are preferably formed on both sides of the profile wall, so that each hollow channel extends between to openings and is thereby laterally accessible, meaning at the front faces of the profile wall.

In an example it is provided, that lateral hollow channel openings of adjacent hollow channels are each connected by a fluid-carrying connection to fluidly connect adjacent hollow channels in series or in parallel. It can be provided, that respectively each second hollow channel is connected by a fluid-carrying connection.

The lateral channel openings are, for example, formed at the front faces of the hollow channels.

In an example the fluid-carrying connection is formed by a tube, by a pipe section or by a fluid-carrying pipe coupling, wherein the fluid-carrying pipe coupling comprises two fluid-carrying plug-in fittings, which are connected in a fluid-tight manner, wherein each plug-in fitting is connected with a hollow channel opening in a plug-in or force-locking manner.

Thereby the hollow channels can be fluidly connected in series or in parallel.

In an example the battery holder comprises a central fluid distributor, which is configured to feed multiple hollow chambers in parallel with fluid, wherein the fluid distributor comprises a central feeder, which with one end is connected in parallel with multiple hollow channels, and wherein the fluid distributor comprises a central discharge, which is connected in parallel with the opposing ends of the hollow channels.

The central fluid distributor enables a parallel feeding of a plurality of hollow channels with fluid, which can increase the cooling efficiency of the heat exchanger. The central feeder can comprise a fluid inlet and multiple fluid arms, which distribute in parallel the fluid supplied at the inlet to the hollow channels.

In an example the hollow channels are configured for the conduction of a fluid. The hollow channels have, for example, a fluid-tight wall and thereby can be fed with fluid. In this example the heat exchanger is directly formed by the hollow channels.

In an example the heat exchanger comprises a meandering pipe, especially an integral meandering pipe, which extends through the hollow channels and is configured for the conduction of a fluid. In this example the hollow channels as well as the meandering pipe are elements of the heat exchanger. The meandering pipe is, for example, disposed adjacent to the walls of the hollow chambers which are facing the module receptacles to ensure an efficient heat transfer towards the profile wall and thereby to the battery modules.

In an example the meandering pipe can be flattened, whereby the adaptation of the surface form of the pipeline to an even wall of the hollow channels is achieved and thereby a larger heat transfer surface between the pipeline and the battery module is achieved. Thereby, the meandering pipe can bear on or in the walls of the hollow chamber in a flat pressed manner.

In an example in each hollow channel a respective pipe support for the support of a meandering pipe section, which extends through the respective hollow channel, is formed. Thereby the meandering pipe can be fixed in the hollow channels and/or pressed onto the walls of the hollow channels to achieve an even better heat transfer.

In an example the hollow channels extend parallel to one another.

In an example the profile wall comprises a base plate, wherein the hollow channels are disposed at a distance from one another on the base plate or below the base plate, and contact the battery modules, the base plate or the hollow channels in an assembled condition. It is also possible that the profile wall comprises a base plate and a cover plate, wherein the hollow channels are disposed sandwich-like between the base plate and the cover plate.

In an example the hollow channels have a wall thickness towards the modules receptacles, which is lower than a wall thickness of the hollow channels towards the base plate. Thereby, an even better heat transfer between the hollow channels and the battery modules can be achieved.

In an example the hollow channels have a circular cross section and are disposed in the hollow chambers of the profile wall or extend in the hollow chambers of the profile wall. The hollow chambers form pipe-like fluid conduits, which can be extruded with the profile wall.

The hollow channels can be formed rotationally symmetric and have a diameter of, for example, 5 mm. A diameter in this area enables a planar implementation of the cover plate across the whole profile wall. The hollow channels can extend into the hollow chambers and can have a spacing, especially an isolation spacing to the base wall.

When the hollow channel opening has a diameter of, for example, 12 mm, the cover plate can follow the curvature of the hollow channel opening in the area of the hollow channel. Furthermore, the hollow channel can be joined with the base wall in the area of the hollow channel opening.

Typically the hollow channel can have a thickness in the area of 1.5 mm to 3 mm. Reinforcing webs, which are disposed between the cover plate and the base plate or between the hollow channel and the cover respectively base plate can have a material thickness in the area of 1.8 mm to 2.2 mm.

The reinforcing webs can especially be suited to increase the thermal conductivity between the cover plate and the base plate or the hollow channel and the cover—respectively base plate and/or the structural strength of the profile wall. For this purpose the reinforcing webs respectively in general the webs are preferably configured to conduct heat.

In an example the profile wall has a height in the area of 10 mm to 15 mm, for example, 13.5 mm. The hollow channels can be formed slot-shaped and comprise a plurality of webs on the inner surface, which is facing the module receptacle. The webs can be formed along a longitudinal direction of the hollow channel. The height of the hollow channel can be 4 mm and is reduced at the positions of the webs. The inner width of the hollow channel can be 20 mm.

The thickness of the cover plate can be in the area of 1.8 mm to 1.2 mm and the thickness of the base plate can be in the area of 1.8 mm to 4.0 mm. In comparison to the thickness of the cover plate the base plate can have a greater thickness, since the base plate has to meet higher requirements with regard to outer action, for example, the penetration of outer parts or gravel impact.

For the fixing of the hollow channels in the hollow channels the webs can be co-extruded. Thereby, the hollow channels can be disposed in the hollow chambers arbitrarily with regard to height, for example, closer to the battery modules or further spaced apart from these.

In an example the base plate the base plate is formed as an underrun protection plate. Thereby, the base plate additionally shields the battery module at the vehicle underside.

It is furthermore possible that the base plate partially comprises a structure for receiving deformation energy by a crash, especially in form of ribs, corrugations or rigidity reduced sections.

In an example, the hollow channels extend spaced apart from each other on the base plate, wherein the base pate sections of the base plate between adjacent hollow channels form bend sections for the bending of the profile wall. In this way the profile wall between the hollow channels can be shipped bent respectively the profile wall can be bent wavelike at the bend sections to enable an efficient adjustment of the length of the profile wall to the vehicle geometry. The bent extends along a bent axis parallel to the longitudinal axis of the hollow channels. The bent section does not comprise a hollow channel and also optionally comprise a reduced wall thickness.

In an example the heat exchanger forms a vaporizer. The fluid vaporizes in the heat exchanger, whereby the module receptacles can be cooled. The vaporizer can be an element of a cooling circuit, which is a part or is not a part of the battery holder. The cooling circuit further comprises, for example, a liquefier or a compressor.

In an example the battery holder further comprises a compressor receptacle for the mounting of a compressor to drive a fluid through the heat exchanger.

In an example adjacent modules are separated from each other by a separating web, wherein the separating web is joined to the profile wall, especially integrally joined. Thereby, the module receptacles are formed niche-like for the receiving of battery modules.

The separating webs can comprise a heat exchanger or be part of the heat exchanger.

In an example the hollow channels comprise elastically deformable side walls. The elasticity of the side walls can be achieved by a convex or concave curvature of the side walls. Thereby, spring-loaded side walls can be realized, whereby the hollow channels can be protected even better.

According to a second aspect the disclosure relates to a battery system with a battery holder according to the first aspect, wherein in each module receptacle a battery module is disposed, and wherein the battery modules are electrically connected to each other.

According the third aspect the disclosure relates to a battery holding system with a first battery holder according to the first aspect; and a second battery holder according to the first aspect; wherein the first battery holder and the second battery holder are disposed above one another; and with a fluid distributor, which is configured to, for example, supply in parallel or in series fluid to the heat exchanger of the first battery holder and the heat exchanger of the second battery holder.

According to a fourth aspect of the disclosure a method for producing a battery holder comprising module receptacles for the receiving of a plurality of battery modules in an electrically driven vehicle, comprising extruding a light metal into a profile wall bent in a cross section with a heat exchanger for the cooling of the module receptacles, wherein the heat exchanger comprises a plurality of hollow channels, which extend along the module receptacles, pulling apart the bent profile wall to receive a planar profile wall; and forming the module receptacles, especially by connecting separating webs, side walls or a base with the profile wall to receive the battery holder.

The hollow channels can be fluidly connected in series and/or in parallel.

By forming the module receptacles inner spaces for the battery modules are formed.

The battery holder can comprise features of the battery holder according to the first aspect. Especially the profile wall can comprise specific bend sections between the hollow channels to enable a bend and pulling apart of the profile wall.

In an example the profile wall is joined in a fluid-tight manner to additional profile walls by friction stir welding. Preferably, the bottom is formed by a few, especially only a single profile wall. An advantage of this method is that only a few profile walls, especially only a single profile wall forms the bottom of the battery holder, so that the length and number of joining faces respectively welding seams executed in a fluid-tight manner can be reduced. The extruding can preferably be executed as described in the printed publication WO 2016/012009, whose content is to be added to this description.

In an example the profile walls of the battery holders are joined to a bottom.

In an example one bottom is joined to a side wall by friction stir welding.

The fluid can further be a cooling fluid or a heating fluid.

BRIEF DESCRIPTION OF THE DRAWINGS

Examples of the principles of the present disclosure are described referring to the accompanying figures.

FIGS. 2A, 2B show examples of the profile wall;
FIG. 4 shows the profile wall in an example.

DETAILED DESCRIPTION OF THE DRAWINGS

Figure 1A:
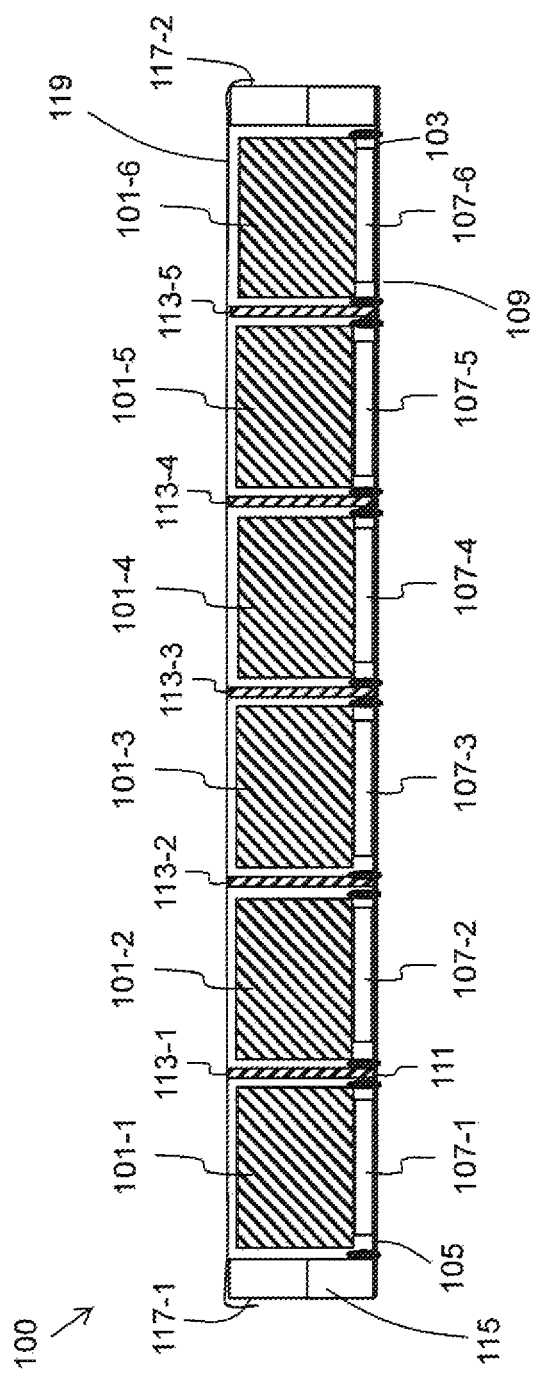
FIGS. 1A, 1B show cross sections of a battery holder in an example.
Figure 1B:
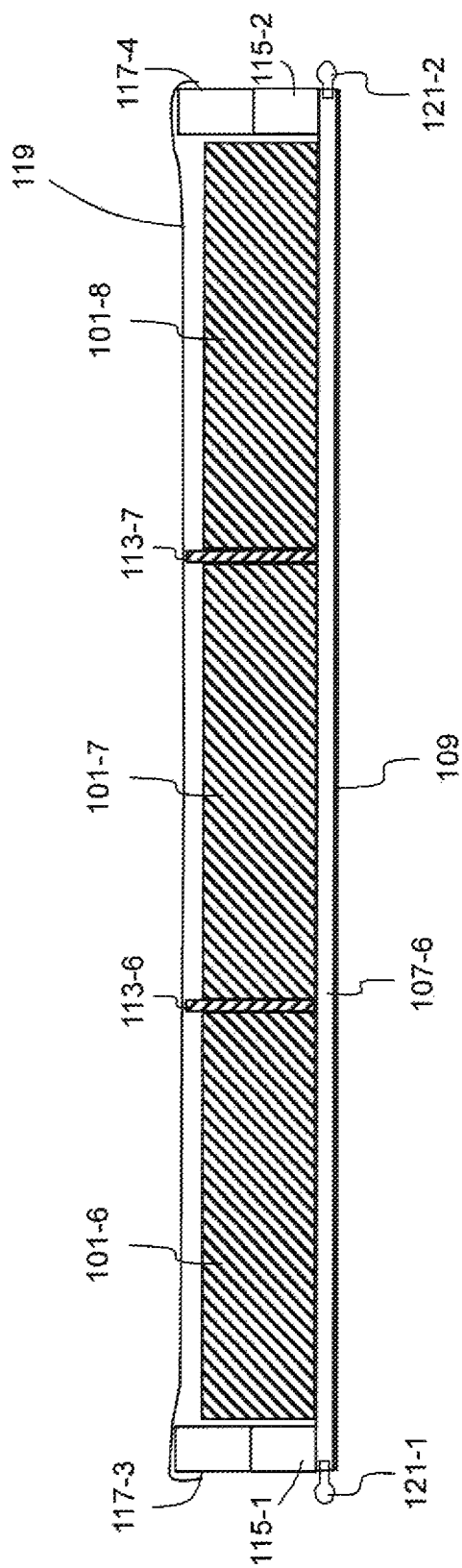

FIGS. 1A, 1B show cross sections of a battery holder 100 for the receiving of a plurality of battery modules 101-1 to 101-6. The battery modules 101-1 to 101-6 are, for example, disposed in a row. Additional battery modules 101, for example, additional battery modules 101-7, 101-8 can be disposed behind the battery modules 101-1 to 101-6. Thereby a matrix arrangement with columns and rows of battery modules 101 is created.

The battery holder 100 comprises a profile wall 103, which defines the plurality of battery modules 101. The profile wall 103 can, for example, be formed as a bottom wall.

A heat exchanger 105 for the tempering of the module receptacles 101 is formed in the profile wall 103, wherein the heat exchanger 105 comprises a plurality of hollow channels 107, for example, hollow channels 107-1 to 107-6, which extend along the battery modules 101.

The hollow channels 107 are disposed on a plate 108, which forms a base plate 109 of the battery holder 100 in the examples shown in FIGS. 1A, 1B. The plate 109 can have an additional function and serve as an underrun protection device.

The hollow channels extend, for example, rectilinearly adjacently on the plate 109, whereby an arrangement of parallel hollow channels 107 is created. Thereby, each hollow channel 107 is provided for one row or one column of module receptacles 101 respectively, as shown in FIGS. 1A, 1B. In an example the plate 109 is an element of the profile wall 103.

The hollow channels 107 can be disposed at a distance from each other, wherein between the hollow channels 107 bend sections 111 of the plate 109 are disposed. Thereby, the profile wall 103 can be bent at the bend sections 111 without deforming the hollow channels 107.

The module receptacles 101 are separated from each other by separating walls 113, for example separating walls 113-1 to 113-7 and form niches respectively troughs for single battery modules. The separating walls 113 are integrally attached to the hollow channels 107 on the base plate 109 in the extension direction of the hollow channels 107. The separating walls 113 can further extend transversely to the extension direction of the hollow channels and are then, for example, integrally attached on the hollow channels 107. Instead of or in addition to this type of attachment supports can be provided, which fix the separating walls 113 to the base plate or the side walls 117.

Each hollow channel 107 is defined by a juxtaposed hollow channel opening 115-1 and 115-2. The hollow channel opening 115-1 and 115-2 are disposed on each side of the profile wall 103, wherein the hollow channel opening 115-1 and 115-2 open laterally of the profile wall 103.

The battery holder 100 is laterally defined by the side walls 117 to 117-4.

In an example the battery holder can further comprise a cover 119, which can be placed on the battery holder 100 and connected to the battery holder 100 in a fluid-tight manner.

In an example the battery holder 100 comprises fluid carrying connections 121 with fluid carrying connections 121-1 to 121-2, which fluidly connect adjacent hollow channels 107 in parallel or in series. With a flow connection of the hollow channels in a row adjacent hollow channel openings 115 are fluidly connected, so that the fluid can flow from one hollow channel 107 to the next hollow channel 107. With a parallel flow connection the hollow channel openings 115-1 are fed in parallel by the fluid carrying connections 121-1 with fluid that exits at the hollow channel openings 115-2 and is drained by the fluid carrying connections 121-2. For this purpose a fluid distributor can be used, which is not shown. The fluid distributor comprises a central feeder, which at one end is connected in parallel to multiple hollow channels 107, and a central discharge, which is connected in parallel with opposite ends of the hollow channels 107.

The hollow channels 107 are facing the battery modules 101 and in one example form a bottom surface for the receiving of the battery modules.

FIG. 2A shows a profile wall 103 from FIGS. 1A and 1B in a cross section in an example. The walls 128, for example vertical walls or side walls of the hollow channels 107 extend in a straight manner, whereby an increased rigidity of the hollow channels can be achieved.

Figure 2B:
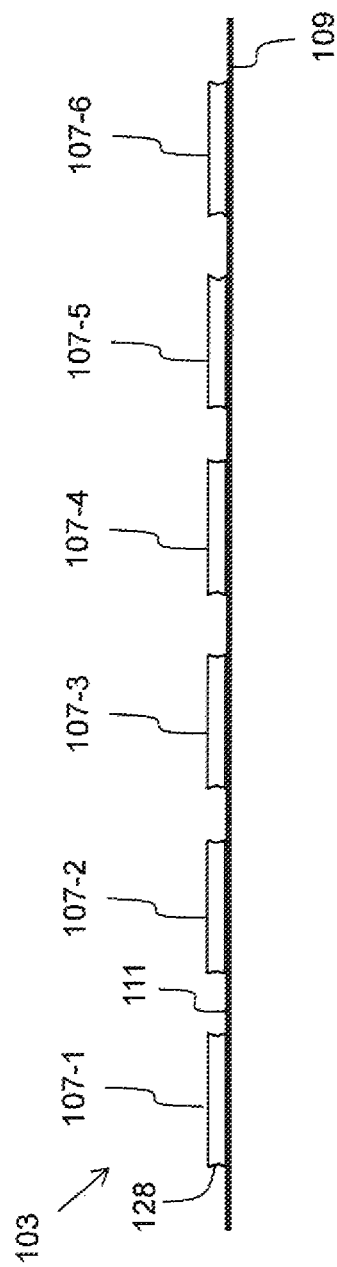

FIG. 2B shows a profile wall 103 from FIGS. 1A and 1B in a cross section in a further example. The walls 128 of the hollow channels 107 are, for example, curved in a convex or concave manner. The walls 128 can optionally be executed thinner that the remaining sections of the hollow channels 107. Thereby, a spring action respectively an elasticity of the walls 128 of the hollow channels can be achieved.

Figure 3A:
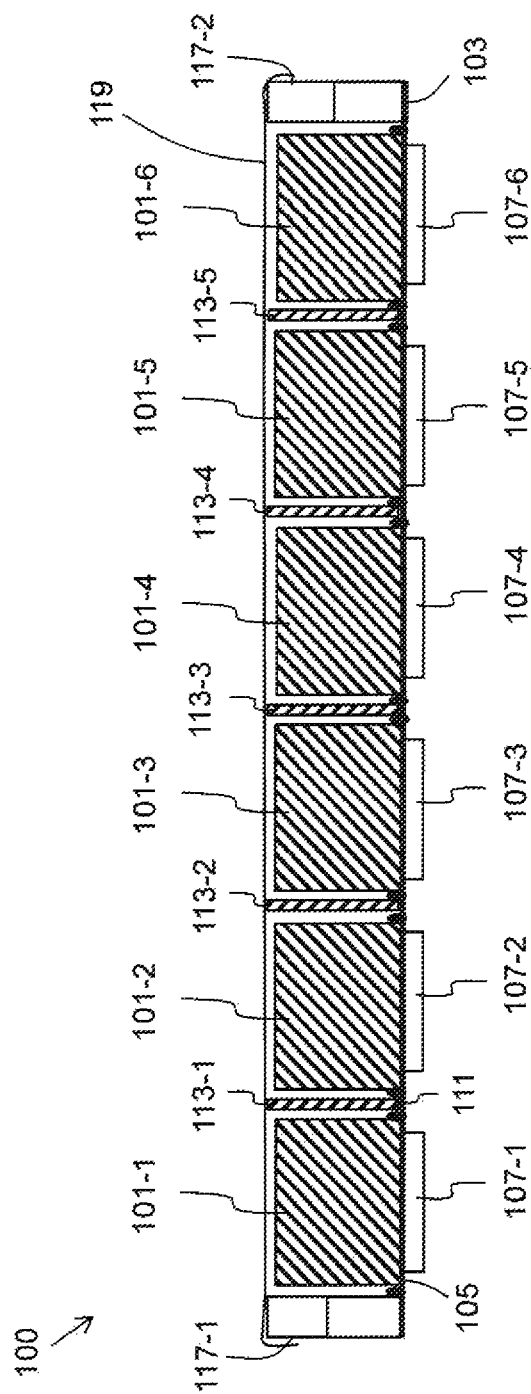
FIGS. 3A, 3B, 3C show the battery holder in an example.
Figure 3B:
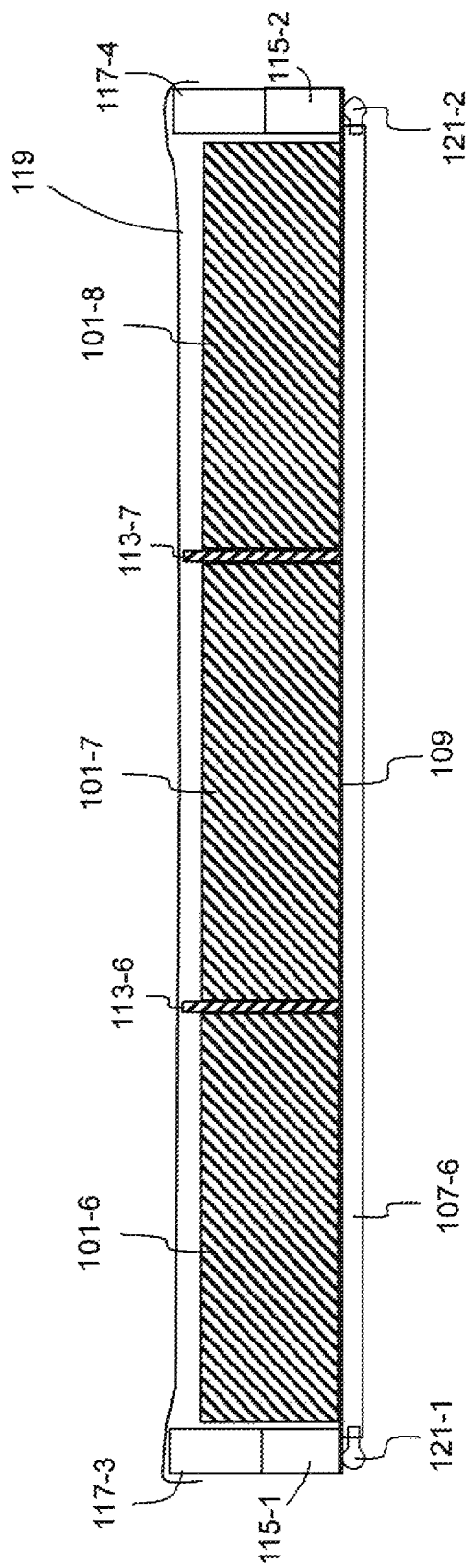
Figure 3C:
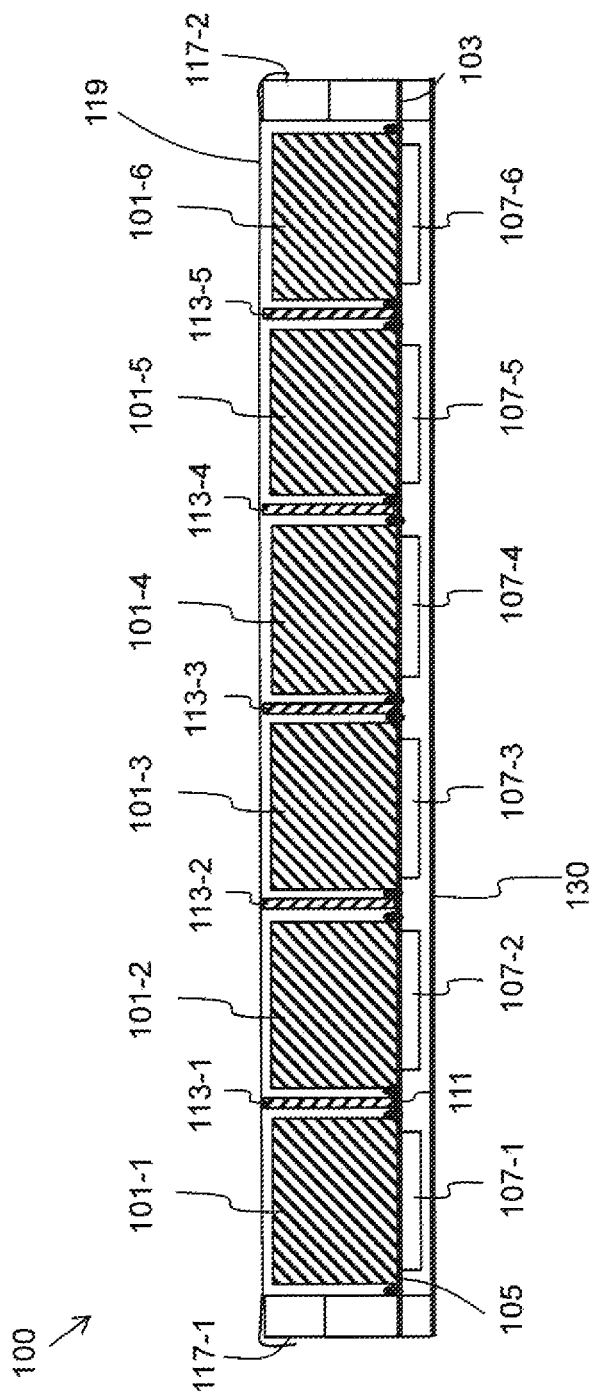

In FIGS. 3A, 3B, 3C the battery holder 100 is shown in an example, in which the profile wall 103 is arranged upside down. The plate 109 is, in contrast to the examples shown in FIGS. 1A and 1B, facing the battery modules 101 and can serve as a bottom surface.

In the examples shown in FIGS. 1A, 1B as well as 3A, 3B, 3C the profile wall 103 is formed as a bottom wall of the battery holder 100. The profile wall 103 can however form one or multiple side walls.

In an example, which is exemplary shown in FIG. 3C, the battery holder 100 can comprise an additional under protection plate 130, which is disposed below the hollow channels 107 and which is provided as an underrun protection device. The under protection plate 130 can be consolidated from synthetic material, GFK or metal. The under protection plate 130 can further be attached to the sidewalls 117, which, for this purpose, in comparison to the examples shown in FIGS. 3A and 3B can be elongated respectively pulled down.

FIG. 4 shows a profile wall 103 from FIGS. 3A and 3B in a cross section. The profile wall 103 is preferably formed as one piece from a single extrusion profile.

Figure 5A:
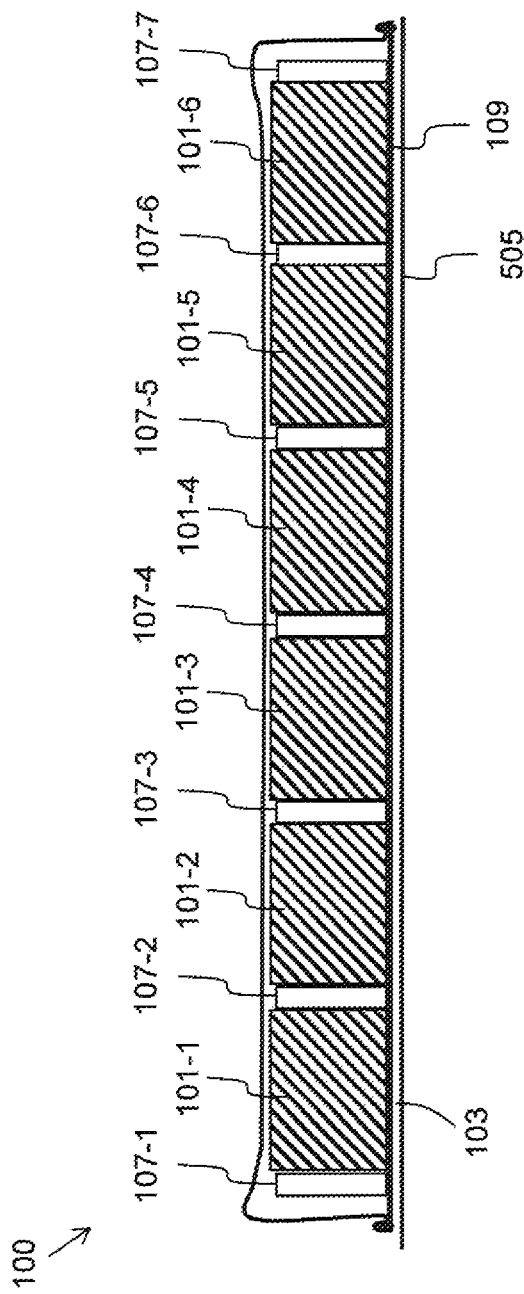
FIGS. 5A, 5B show the battery holder in an example.
Figure 5B:
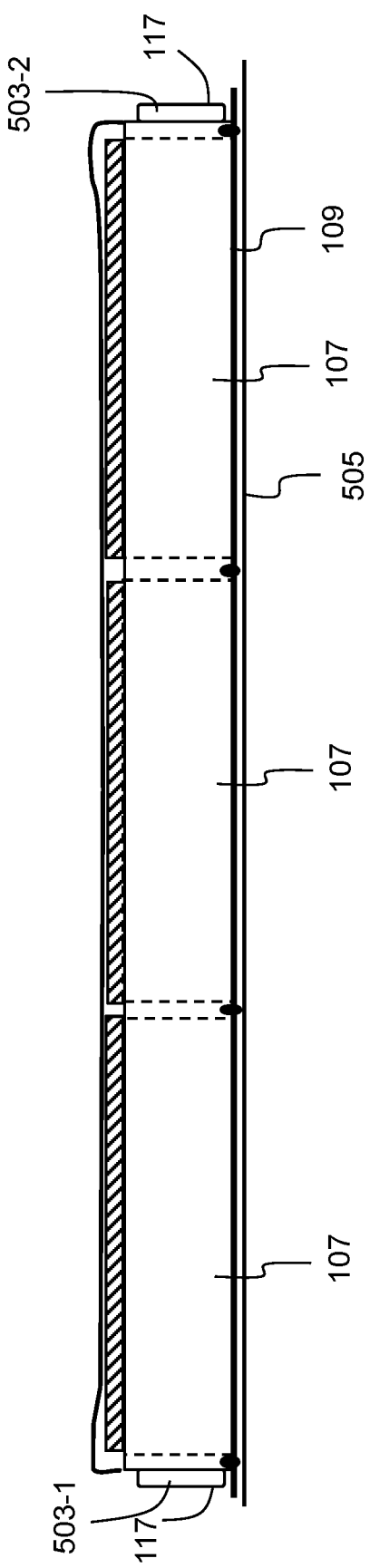

In the example shown in FIGS. 5A and 5B the hollow channels 107 of the profile wall 103 form side walls 117 of the battery modules 101. Thereby, the battery modules are cooled laterally.

The battery holder 100 comprises, for example, a fluid distributor 503, with a central feeder 503-1 for the parallel feeding of the hollow channels with fluid and a central discharge 503-2 for the receiving of the fluid. The fluid distributor 503 can in an analogous manner be provided in the examples shown in FIGS. 1A and 1B.

As observable in FIG. 5B in the longitudinal section in the area of a side wall 117, the hollow channels 107 can be fluidly connected in series by not shown pipe couplings.

Optionally, the protection plate 505 can be provided as an underrun protection device, which is disposed under the plate 109 and is coupled with the battery holder 100 and/or with the body of the motor vehicle.

Figure 6:
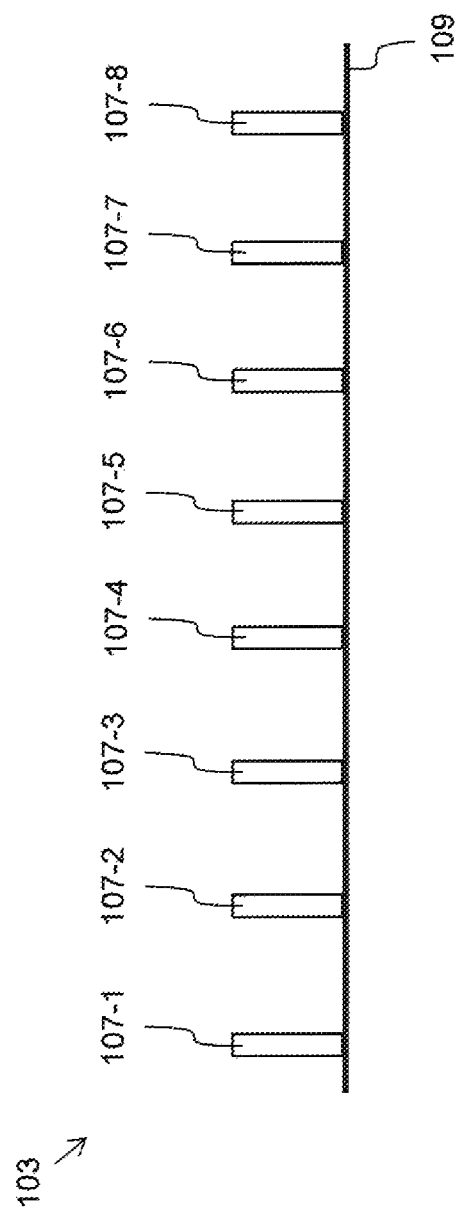
FIG. 6 shows the profile wall in an example.

In FIG. 6 an example of the profile wall 103 from FIGS. 5A and 5B is shown. In contrast to the example shown in FIG. 3 the hollow channels 107 are rotated by 90° and thereby form sidewalls 117 of the module receptacles 101 respectively the battery holder 100.

In an example the hollow channels 107 form fluid channels and can be directly fed with fluid like gas or liquids. The hollow channels are connected by the plate 109, especially in an integral manner or from a single extrusion profile. Alternatively, two or three profile walls are integrally joined in a fluid-tight manner.

In a further example the hollow channels are provided for the receiving of a fluid conduit, for example, a meandering pipe. In case of a frontal or lateral impact the side walls 117 serve to forward the load and to protect the battery modules from deformation.

Figure 7A:
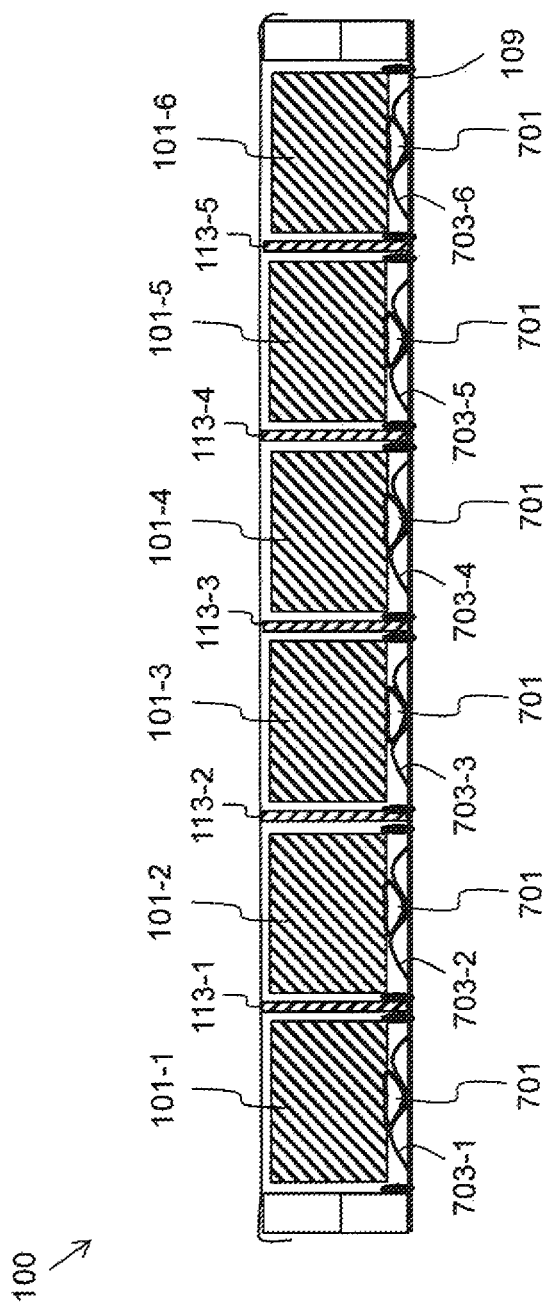
FIGS. 7A, 7B, 7C show the battery holder in an example.
Figure 7B:
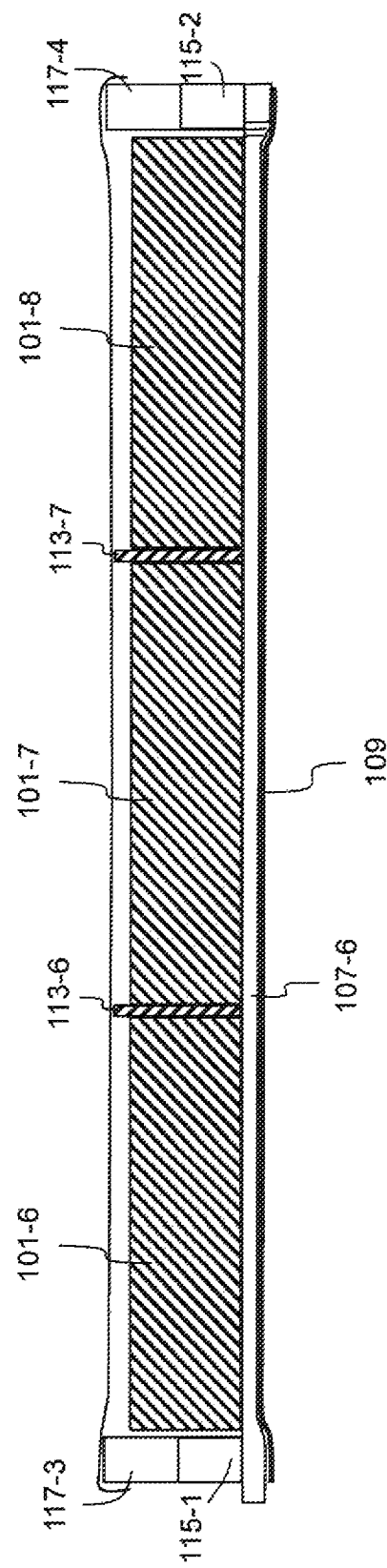
Figure 7C:
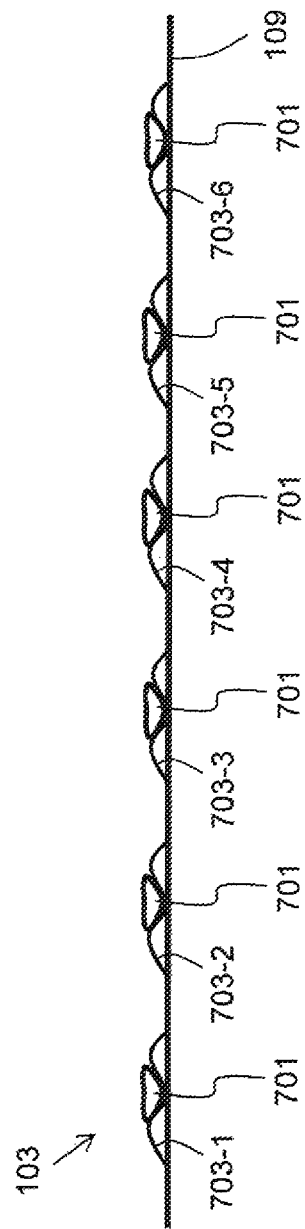

In FIGS. 7A, 7B and 7C an example of the battery holder 100 with a meandering pipe 701 is shown, which is flattened and bent several times and supported by the hollow channels 107 in form of pipe supports 703-1 to 703-6 for the support of the meandering pipe 701.

In an example the pipe supports 701-1 to 703-6 are resiliently formed, wherein the meandering pipe 701 is resiliently mounted. Thereby, a further suspension of the battery modules 101 with regard to the base plate 109 can be achieved.

Figure 8:
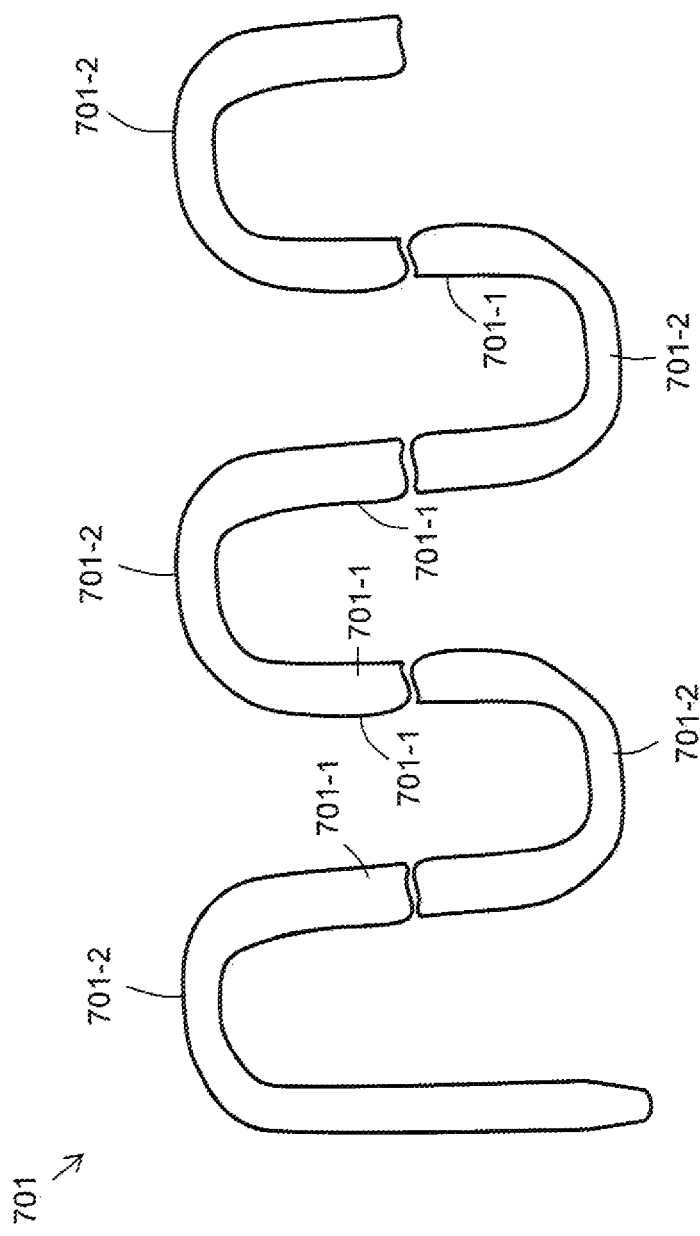
FIG. 8 shows a meandering pipe in an example.

In FIG. 8 an exemplary meandering pipe 701 is shown, wherein due to space limitations rectilinear extending pipe sections are shown shortened.

In an example the meandering pipe sections 701-1 of the meandering pipe 701, which extend through the hollow channels, are flattened or oblate, whereby a larger heat transfer surface to the battery modules is created. However, on the inlet and outlet side the meandering pipe 701 is round, whereby the feeding of the meandering pipe 701 with fluid can be simplified.

The meandering pipe 701 can be integrally formed and comprise bend sections 701-2, which extend outside of the hollow channels 107.

The meandering pipe 701 can however formed from a plurality of pieces from the bend sections 701-1, which are fluidly connected with each other in parallel or in series by fluid connectors.

The pipe supports 703-1 to 703-6 are preferably integrally and substance uniformly formed with the base plate 109 respectively with the profile wall 103 and vaulted in the middle to receive the pipe sections 701-1.

Figure 9A:
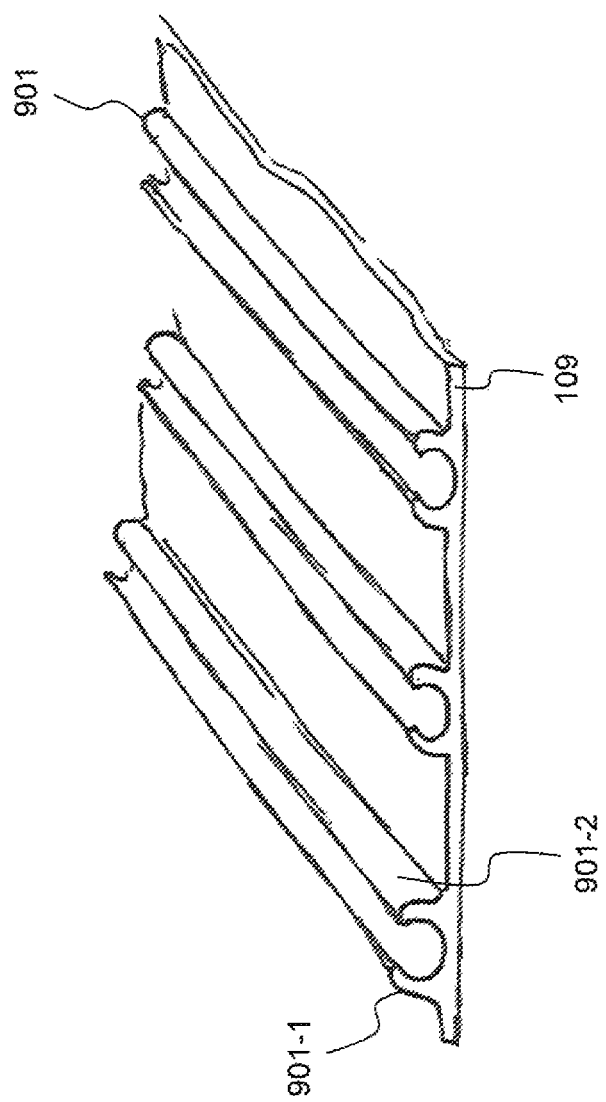
FIGS. 9A, 9B show pipe supports.
Figure 9B:
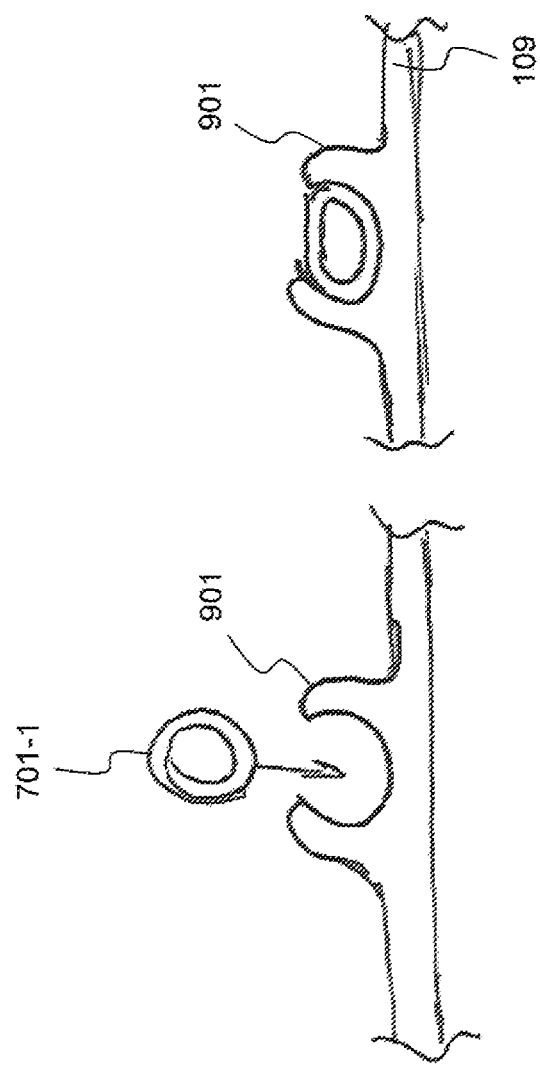

In the example shown in FIGS. 9A and 9B the pipe supports 901 are formed in the plate 109. The pipe supports 901 comprise rounded arms 901-1, 901-2, which define receptacles for the meandering pipe 701 respectively its pipe sections 701-1.

The battery holder 100 cab be stacked on top of each other, whereby vertical battery holding systems are created.

FIGS. 11A, 11B, 11C, 11D, 11E, 11F, 11G, 11H and 11J show examples of the battery holder 100.

The profile wall 103 is provided as a hollow chamber profile with hollow chambers 106, in which hollow channels 107 are formed, which are penetrable by a fluid—The hollow channels 107 preferably have a circular cross section.

The hollow channels 107 are disposed between superimposed walls 1101, 1193, for example a base wall 1101 and a cover wall 1103 and connected to these in a heat conducting manner.

As indicated in FIG. 11A the hollow channel 107 can be directly joined with the wall 1103 and the wall 1101 with a rectilinear web 1105. The web 1105 extends radially in the direction of the lower wall 1101. In this way the hollow channel 107 is closer to the upper wall 1103, which is disposed facing the battery module 101.

Figure 11:
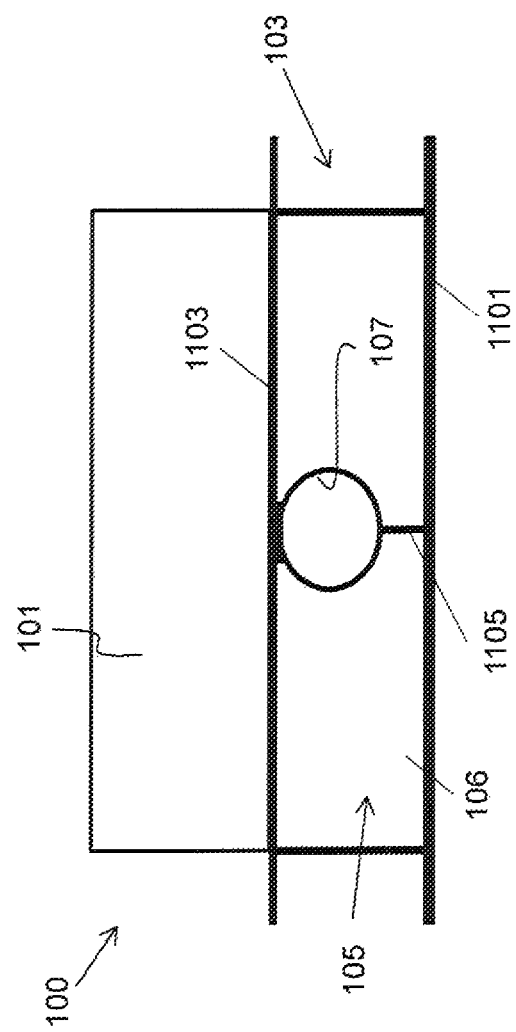
FIGS. 11A, 11B, 11C, 11D, 11E, 11F, 11G, 11H, 11J show the battery holder in several examples.
Figure 11B:
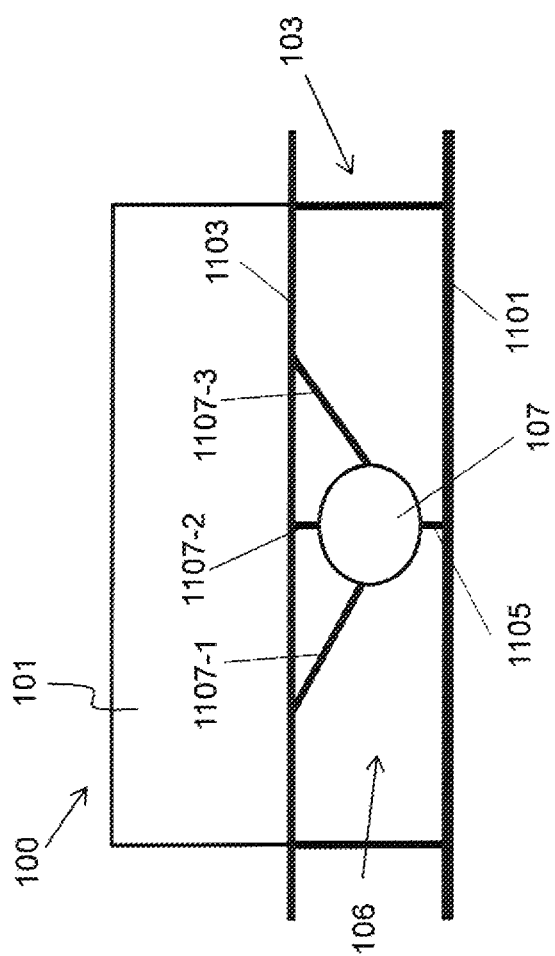

As indicated in FIG. 11B the hollow channel 107 can be directly joined with the wall 1103 and the wall 1101 with the webs 1107-1, 1107-2 and 1107-3 and joined with the wall with the web 1105. The web 1105 extends radially in the direction of the lower wall 1101 and is implemented shorter than in the examples shown in FIG. 11A. The webs 1107-1, 1107-2 and 1107-3 extend fan-like in the direction of the upper wall 1103, wherein the webs 1107-1 and 1107-3 are disposed at an angle towards each other. The web 1107-3 however extends radially in the direction of the upper wall 1103.

Figure 11C:
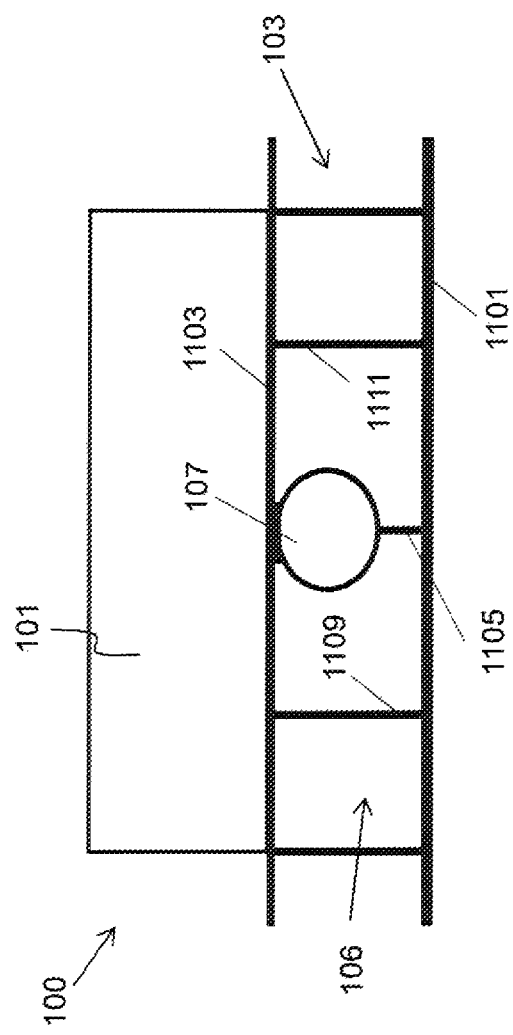

On both sides of the hollow channel 107 additional reinforcing webs 1109, 1111 can be disposed, which join like walls 1101, 1101 in the hollow chamber, as shown in FIG. 11C. In this way an even higher rigidity of the battery holder can be achieved.

The hollow channels 107 can be extruded with the profile wall 103 as well as with the webs 1105, 1107-1, 1107-2, 1107-3, 1109, 1111. In this way the profile wall 103 can be realized in a extrusion process.

The hollow channels in all examples can be formed as hollow chambers 107 or comprise hollow chambers 106 and form side wall 103 or side wall 117 in the finished formed condition. The profile wall 103 can further be provided as a base or intermediate base for the receiving of a plurality of battery modules.

As indicated in FIG. 11D the hollow channel 107 can be directly joined with the wall 1103. The hollow channel 107 and the wall 1101 are set apart from each other and thereby are not connected. Additionally, the profile wall 103 is set apart from the wall 1101 and is connected with the wall 1101 by webs 1125, 1127.

The profile wall 103 comprises an aperture 1129 which is facing away from the module receptacle 101. Thereby, the hollow chamber 106 can be unilaterally opened. In this way the heat can be efficiently dissipated from the hollow chamber 106 towards the outside.

The hollow channel 107 is set apart by the distance a from the wall 1101. The distance A is preferably smaller than the height H of the hollow chamber 106.

Figure 11E:
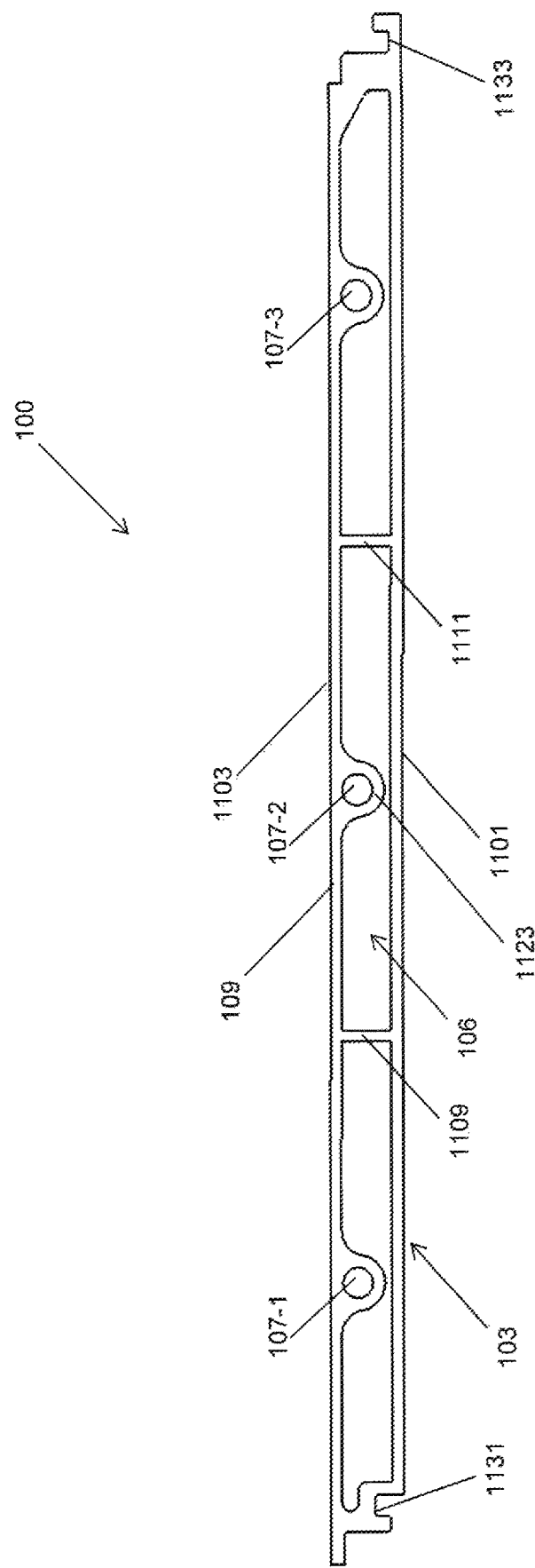

FIG. 11E shows a cross section of a schematic drawing of the battery holder 100 with a formed-on heat exchanger structure 109. The hollow channels 107-1 to 107-3 are in each case disposed in a hollow chamber 106. The hollow channels 107-1 to 107-3 comprise a circular cross sectional area, wherein the wall 1123 which defines the hollow channels 107-1 to 107-3 on the low side follows the cross section of the hollow channels 107-1 to 107-3 and accordingly is formed in a circular shape. The section plane of the drawing is disposed transversely to the longitudinal direction of the hollow channels 107-1 to 107-3. The hollow channels 107-1, 107-2, 107-3 are set apart from each other as well as from the wall 1101 of the profile wall 103.

In an example the hollow channels 107-1, 107-2 and 107-3 are formed by extrusion of a light metal alloy.

Figure 11F:
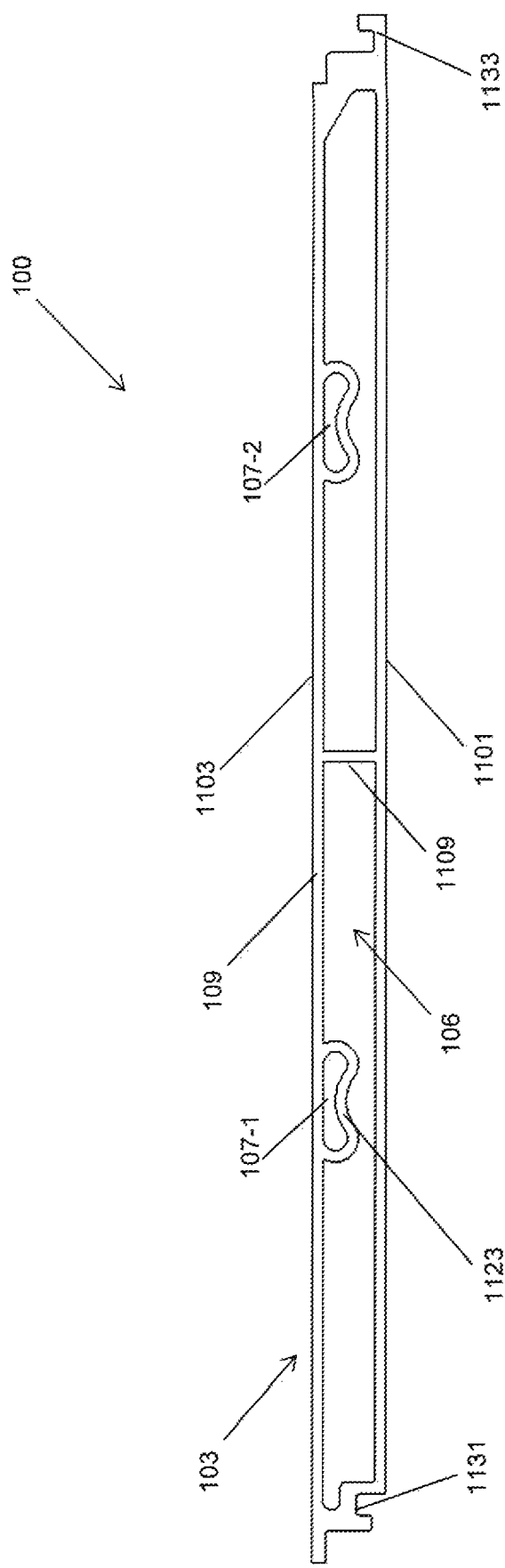

FIG. 11F shows a cross section of a schematic drawing of the battery holder 100, which comprises a formed-on heat exchanger structure 109. The hollow channels 107-1, 107-2 are in each case disposed in a hollow chamber 106. The hollow channels 107-1, 107-2 have a rounded flattened cross section, wherein the wall 1123, which defines the hollow channels 107-1, 107-2 follows the cross section of the hollow channel 107 and accordingly is shaped rounded. The walls 1123 are formed into the interior of the hollow chambers 106 and form web-like, especially cylindrical structures, in which the hollow channels 107 are formed. The section plane of the drawing is disposed transversely to the longitudinal direction of the hollow channels 107-1, 107-2.

The cross sectional shape of the hollow channels 107-1, 107-2 shown in FIG. 11F yield a reduced cross sectional area compared to a circular cross section and thereby a reduced receivable fluid volume in the hollow channels 107-1 and 107-2. Thereby, a weight optimization of the battery holder 100 during operation is achieved.

At the end fastening tabs 1131, 1133 for the hooked respectively integral coupling with another profile wall 103 respectively with another hollow chamber profile with integrated heat exchanger structure are provided.

Figure 11G:
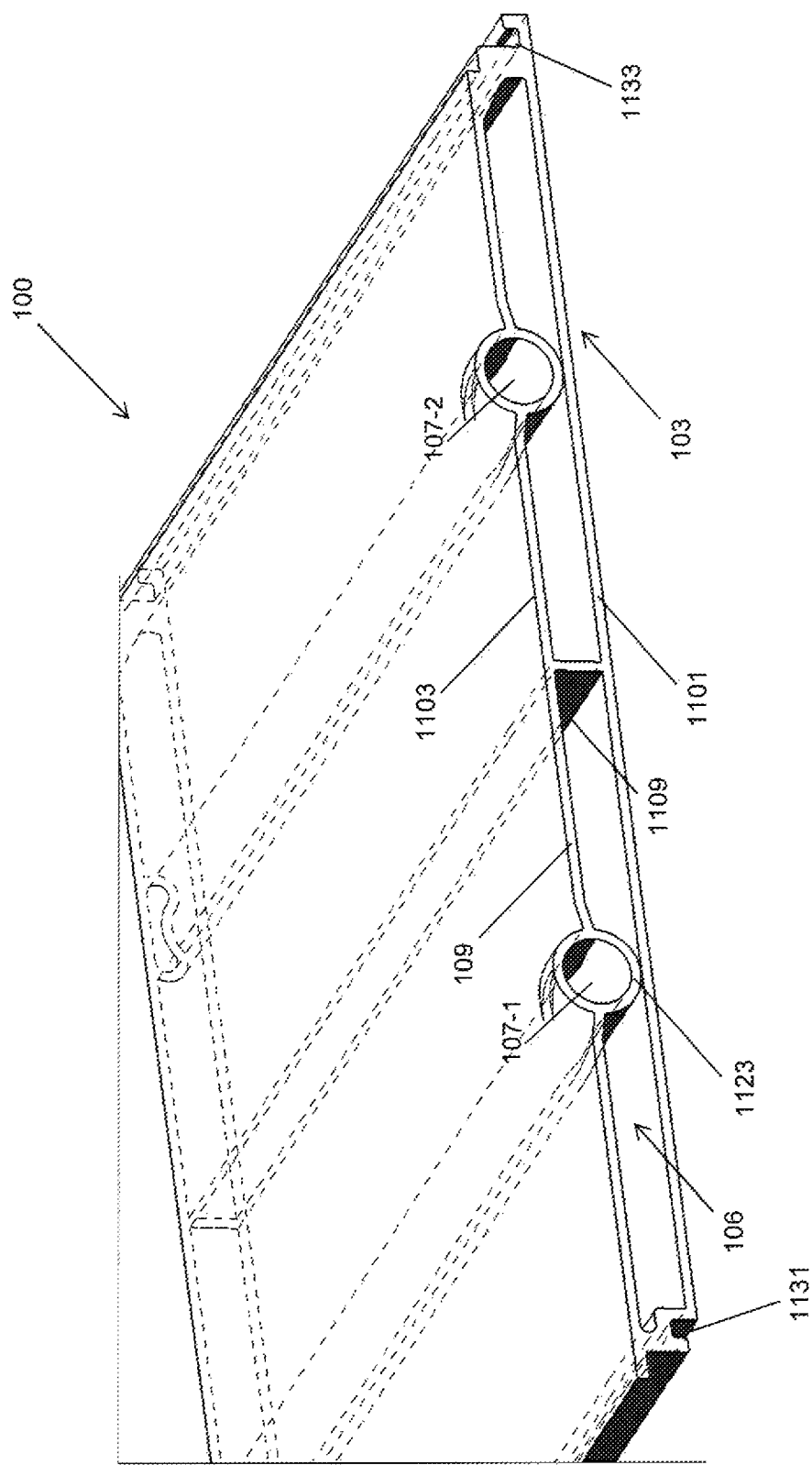

FIG. 11G shows a schematic drawing of the battery holder 100, which similarly to the examples shown in FIGS. 11E and 11F comprises a formed-on heat exchanger structure 109. The hollow chamber openings 115 comprise a circular cross sectional area, wherein the section of the cover wall 1103, which defines the hollow channels 107-1, 107-2 follows the cross section of the hollow profile opening 115 at the front face of the battery holder and accordingly is formed in a circular shape. With the circular form of the section of the cover wall 1103 the planar profile of the cover wall 1103 is interrupted in the area of the hollow channels 107-1, 107-2 by a curvature.

In an example the hollow channels 107-1, 107-2 have a continually changing cross section along a longitudinal axis 1113 of the hollow channels 107-1, 107-2. Especially in the first section of the hollow channels 107-1, 107-2 along the longitudinal axis a transformation of the circular cross section to the rounded cross section according to the example shown in FIG. 11F is effected. Following this first section of the hollow channels 107-1, 107-2 a planar profile of the cover wall 1103 results again and the cross section of the hollow chambers 107-1, 107-2 is according to the example shown in FIG. 11 formed rounded and flattened.

This way of the forming of the hollow channel openings 115 enables the combination of a circular cross section of the hollow channel openings 115 with a rounded shaped cross section of the hollow channels 107-1, 107-2. A circular cross section of the hollow channel openings 115 is especially advantageous for the receiving of or connection with a pipeline, a tube or a screw-in or plug-in connector. A complexly formed cross section of the hollow channels 107-1, 107-2 however can be advantageous for the heat transport between the cover wall 1103 and the medium in the hollow channels 107-1, 107-2. Through combination of the cross section forms both of the aforementioned advantages can be combined.

Figure 11H:
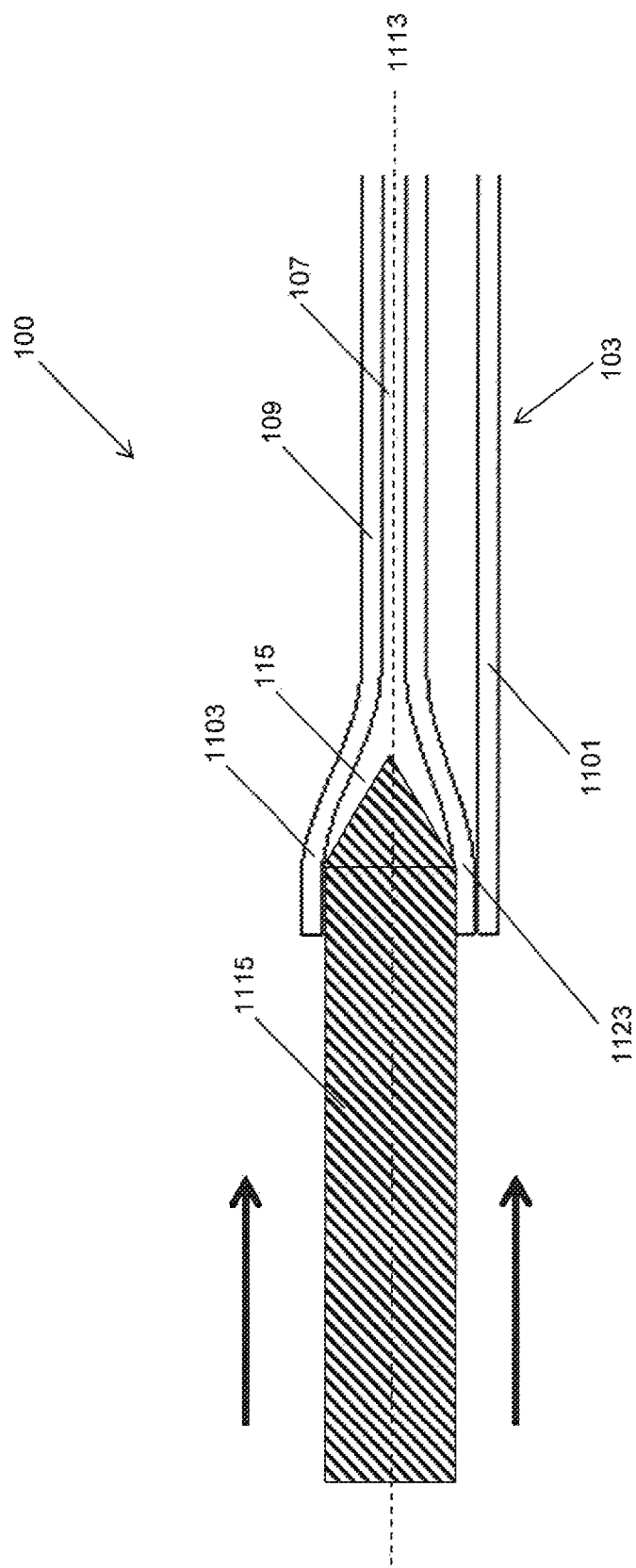

FIG. 11H shows a cross section of the hollow channel 107 according to the example shown in FIG. 11G. The section plane of the drawing is disposed parallel to the longitudinal axis 1113 of the hollow channel 107. The hollow channel opening 115 has a circular cross section area, which in a first section of the hollow channel 107 along the longitudinal axis 1113 of the hollow channel 107 is formed into a complexly shaped cross sectional area according to the example shown in FIG. 11F.

Furthermore, FIG. 11H shows an especially circular form tool 1115, which penetrates and plastically deforms the first section of the hollow channel during a process. In particular, such a circular cross section of the hollow channel opening 115 is formed, which in the first section of the hollow channel 107 continually transitions into the original cross sectional shape of the hollow channel 107.

In an example the cover wall 1103 is joined to the base wall 1101 in the area of the hollow channel 107. Thereby, the hollow channel 107 is defined by the base wall 1101. It is also possible that the base wall 1101 and the wall 1123 are spaced apart from each other to create a buffer chamber to the road or an insulation to the hollow channel 107.

Figure 11J:
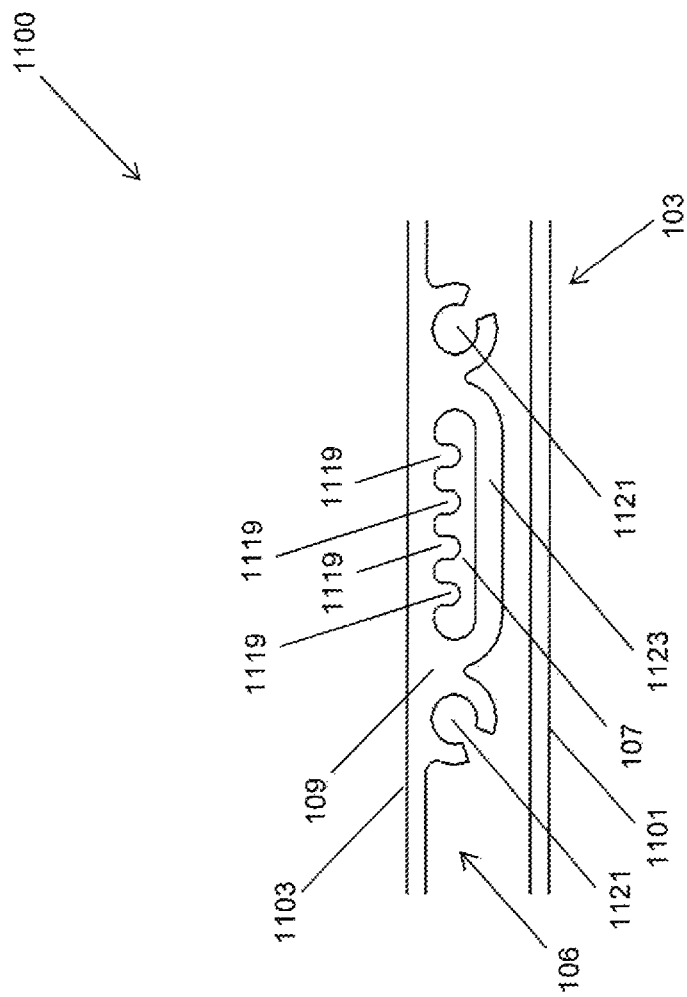

FIG. 11J shows a cross section of the profile wall 103 with a hollow channel 107, wherein the cover wall 1103 between the hollow channel and the module receptacle 101 on the side of the hollow channel comprises a plurality of webs 1119, which are formed in direction of the longitudinal axis 1113 of the hollow channel 107 and extend into the hollow channel 107. The hollow channel 107 comprises a slot-shaped cross section and comprises laterally an additional hollow channel 1121, which circumferentially comprises an aperture, which can extend across the whole profile wall 103 in the direction of the longitudinal axis 1113 of the hollow channel 107.

In an example the further hollow channels 1121 form axial bolting points for the attachment of a fluid collector. The fluid collector can be connected with the battery holder 100 respectively with the profile wall 103 by screw connections in the further hollow channels 1121, so that an in particular fluid-tight connection between the hollow channel 107 and the fluid collector can be created.

The further hollow channels 1121 form a structure on the hollow channel 107, which provides additional rigidity to the profile wall 103.

The contact surface between the medium and the hollow channel 107 and the profile wall 103 is enlarged by the webs 1119, so that the surface, which is available for the heat transport between the profile wall and the medium in the hollow channel 107, can be advantageously enlarged. Additional complex forms of the outer wall 1123 of the hollow channel 107 are imaginable, which can further enlarge the surface.

The circular, especially rotational symmetric hollow channel opening 115 can advantageously be used for the connection of a connection element, especially a pipe coupling of a tube or pipe. Thus, in particular, a sealed connection can be achieved, for example, by introducing a seal between the hollow channel 107 or the hollow channel opening 115 and the connection element.

The webs 1119 can be extruded with the profile wall 103 using a higher strength alloy, so that advantageously a simultaneous manufacturing of the complete battery holder 100 is possible and the manufacturing time till completion of the battery holder 100 can be reduced.

There can be a distance, in particular an insulation distance, between the outer wall 1123 of the hollow channel 107 and the base wall 1101. Thereby, the heat exchanger structure 109 can be insulated from the base wall 1101, especially thermally insulated.

Figure 12A:
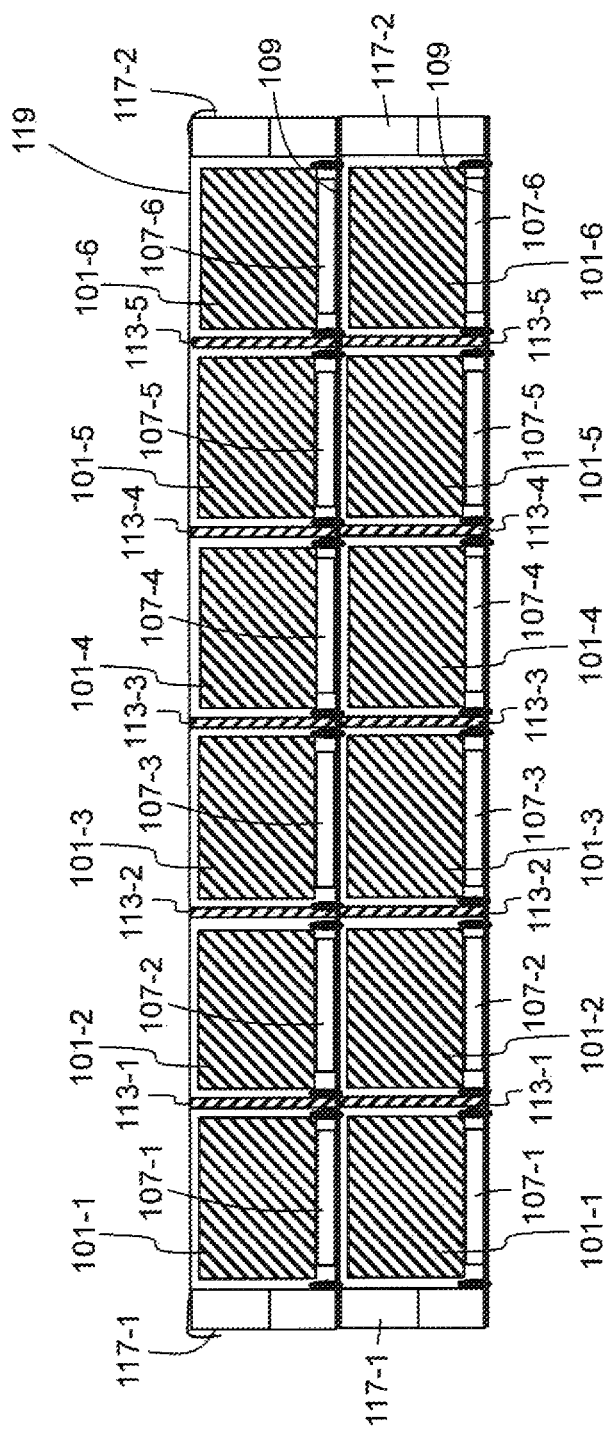
FIGS. 12A, 12B show a battery holding system in an example.
Figure 12B:
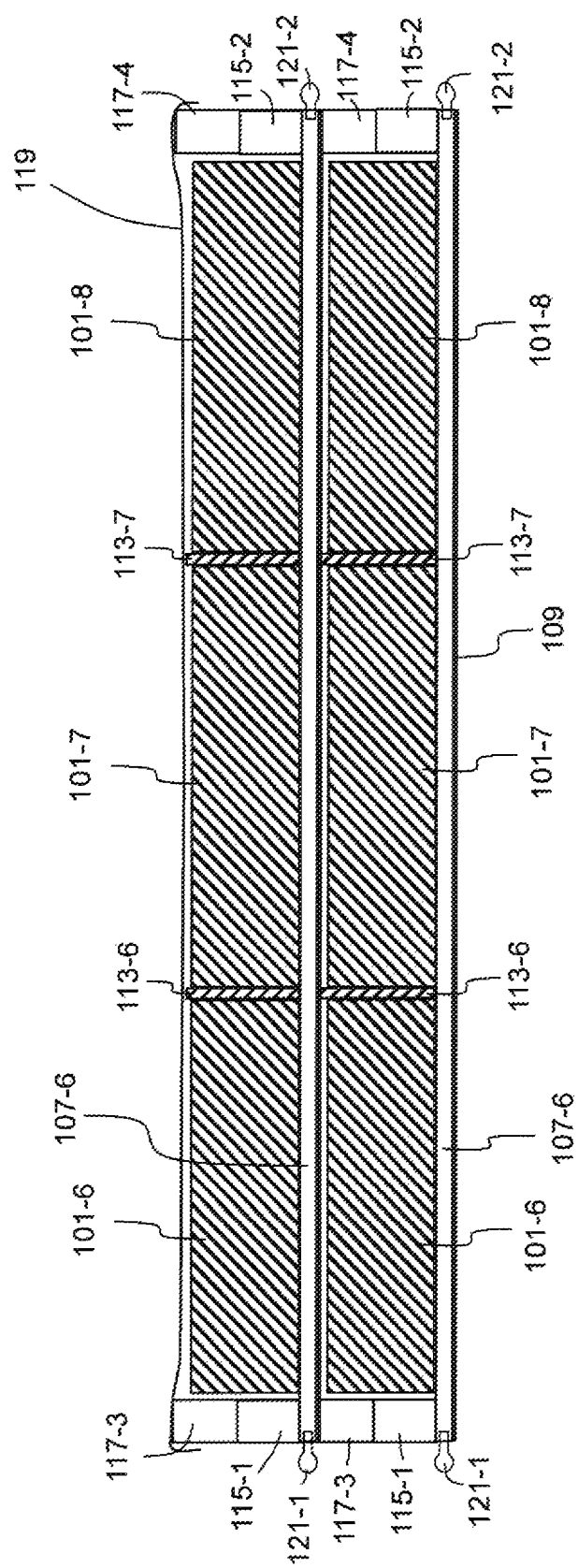

FIGS. 12A and 12B show a battery holding system comprising stacked one above another battery holders 100 according to the example shown in FIGS. 1A and 1B. The battery holders 100 are, for example, integrally joined to each other.

Figure 14A:
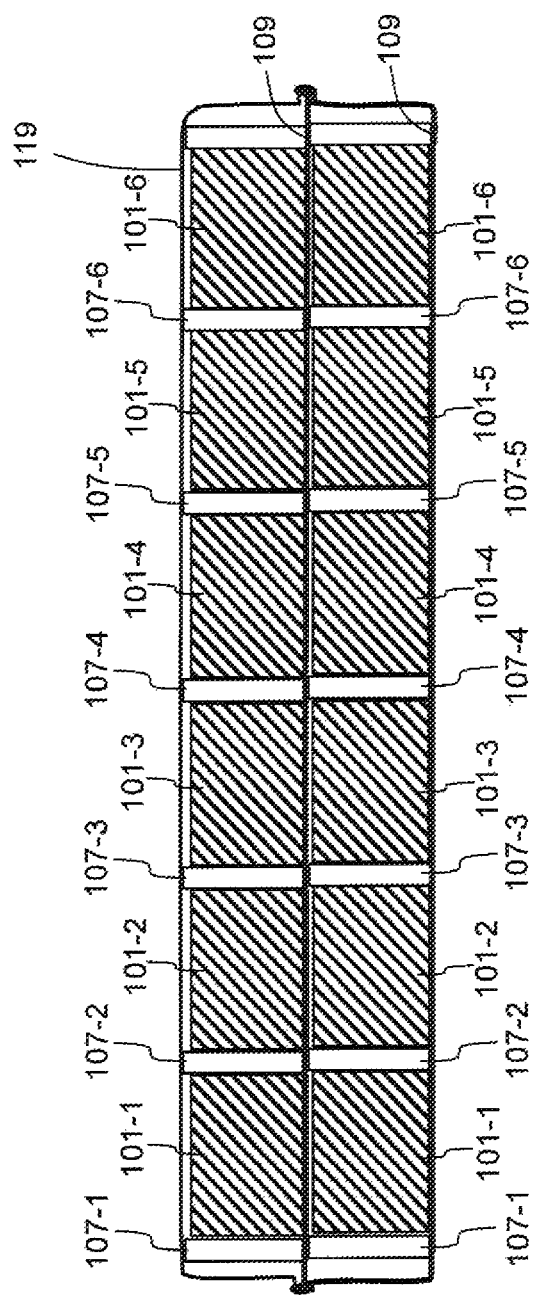
FIGS. 14A, 14B show a battery holding system in an example.
Figure 14B:
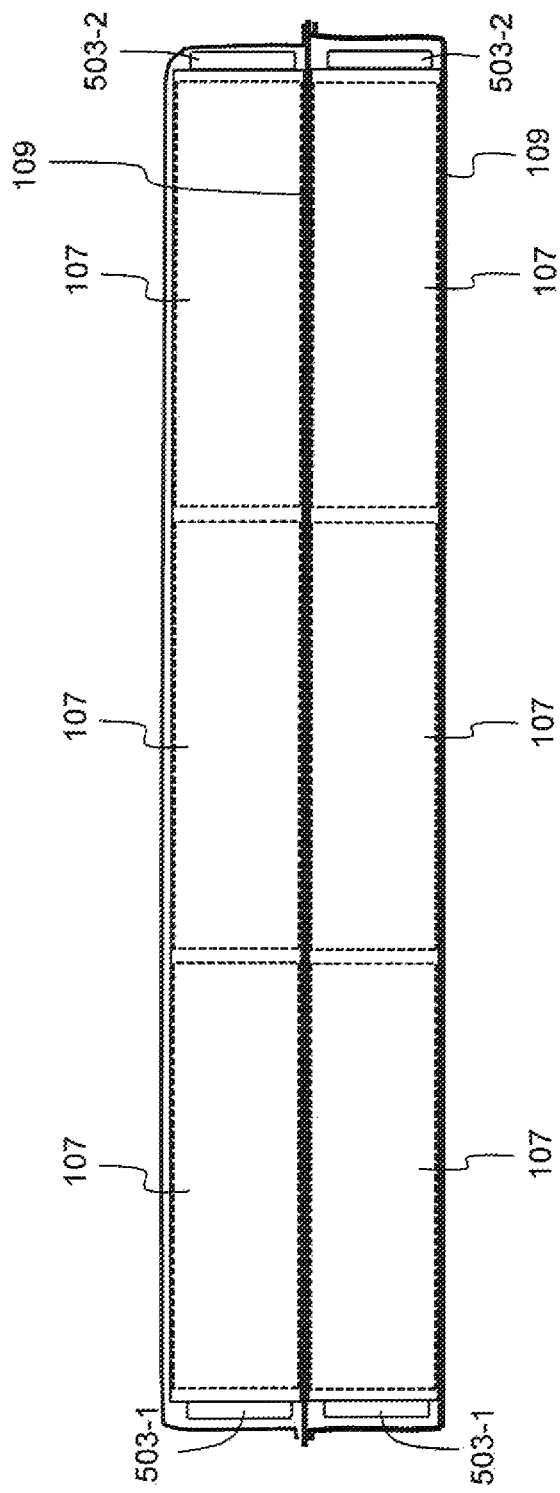

FIGS. 14A and 14B show a battery holding system comprising stacked one above another battery holders 100 according to the example shown in FIGS. 5A and 5B. The battery holders 100 are, for example, integrally joined to each other.

Figure 10:
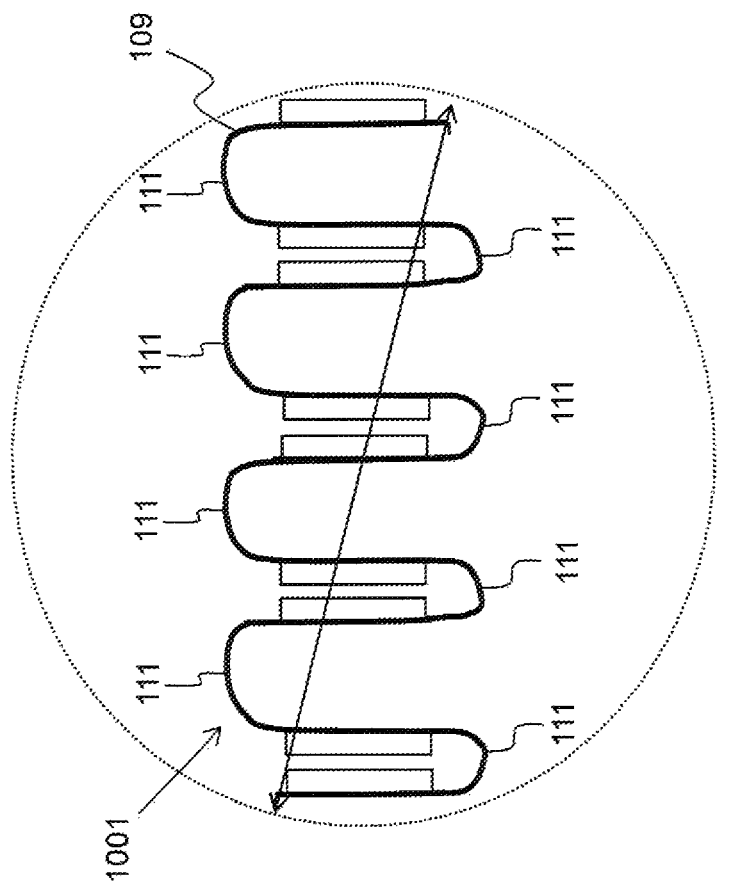
FIG. 10 shows an extrusion-mold-matrix in an example.

For the production of the battery holder 100 from the FIGS. 1A and 1B a profile wall 103 can be provided as an extrusion profile formed in an extrusion die 1001 indicated in FIG. 10. Here, the plate 109 is bent wave-like at the bend sections 111 and can subsequently be pulled apart. For the production of the profile wall 103 multiple extrusion profiles 1001 having a smaller diameter than shown in FIG. 10 can be extruded and joined to each other in an integral or fluid-tight manner.

Figure 13:
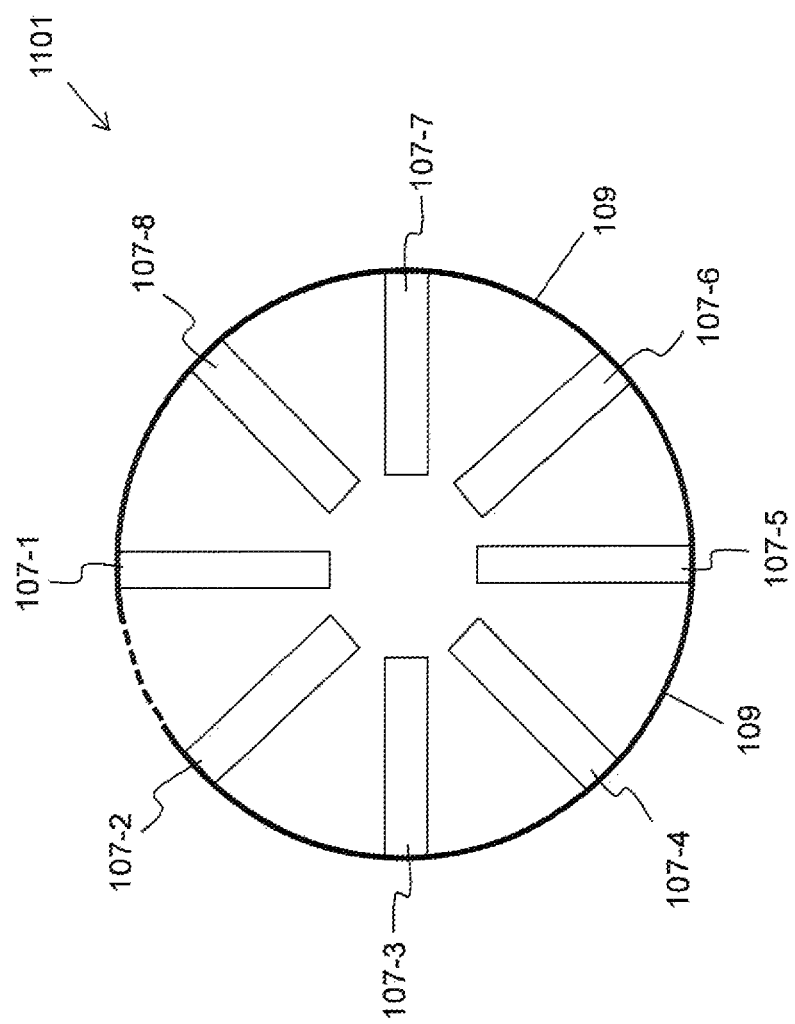
FIG. 13 shows an extrusion-mold-matrix in an example.

For the production of the battery holder 100 from the FIGS. 3A and 3B a profile wall 103 can be provided as an extrusion profile formed in an extrusion die 1101 indicated in FIG. 13. Here, the plate 109 is circularly bent with curvatures at the bend sections 111 and can subsequently be pulled apart. For this purpose the plate 109 can be extruded cohesively and subsequently slotted.

For the production of the profile wall 103 multiple extrusion dies 1001 with a smaller diameter than shown in FIG. 10 can be extruded and joined to each other, for example, in an integral or fluid-tight manner.

The hollow channels 107 can be formed as hollow chambers and form the profile wall 103 or the side wall 117 in a finished formed condition. The profile wall 103 can further be provided as a base or intermediate base for the receiving of a plurality of battery modules.

In an example the hollow channels 107 comprise wall thicknesses, which are equal to or smaller than 2 mm in the examples with module base cooling, FIGS. 1A, 1B as well as in the examples with side wall cooling according to FIGS. 13 and 14.

In an example the hollow channels 107 can comprise locally embossed walls, for example, for a wall surface enlargement respectively for a reduction of flow turbulence.

In an example the hollow channels 107 can be formed as a reinforcement strut, which is inherently rigid to shear, a bending-resistant reinforcement strut or fastening strips with wall thicknesses of, for example, 2 mm.

The hollow channels 107 can further be formed with a wave-like or meander-shaped cross section in the initial profile during the production.

In an example the base 109 comprises a projecting base surface, which is advantageous for the mounting of the side walls, the cover respectively cover trough as well as the fluid distributor.

In an example support struts can be integrated transversely to the longitudinal axis of each hollow channel in the plate 109 in the underrun protection device. Supporting struts may also be provided transversely to the hollow channel longitudinal axis. Thereby, the material properties are, for example, Rm>250 MPa, preferably RM>300 MPa in case of an aluminum alloy of the series 5000 or 6000 or 7000.

Figure 15:
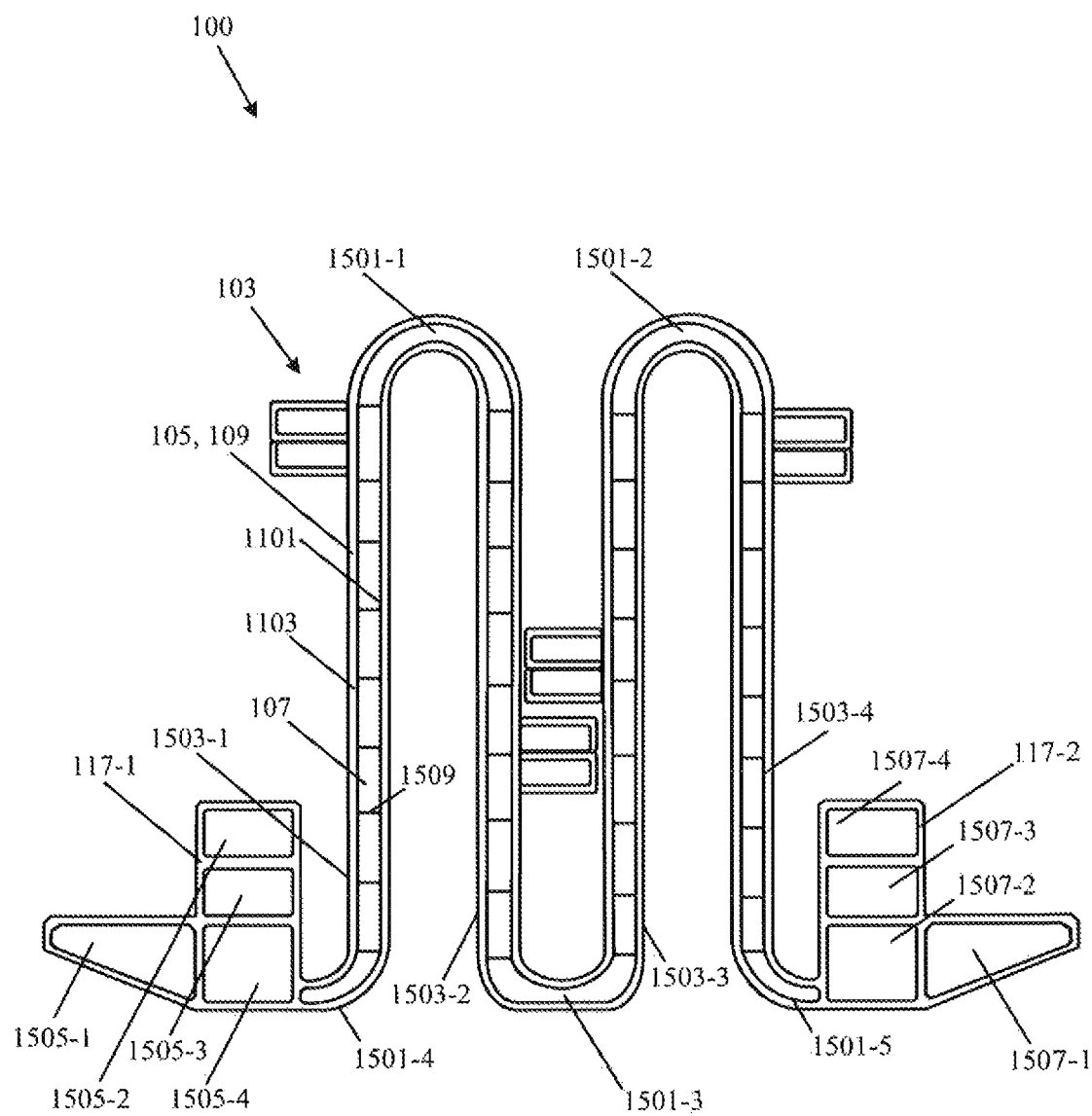
FIG. 15 shows the profile wall in an example.

FIG. 15 shows a cross sectional view of a schematic drawing of the profile wall 103 of the battery holder 100 with a heat exchanger 105. The hollow channels 107 are in each case disposed between the base wall 1101 and the cover wall 1103 of the base plate 109. The hollow channels 107 comprise a rectangular cross sectional area and are separated by rectilinear webs 1509, which connect the base wall 1101 and the cover wall 1103.

The profile wall 103 can have a meandering form comprising bent sections 1501-1, 1501-2, 1501-3, 1501-4 and straight sections 1503-1, 1503-2, 1503-3, 1503-4. The side walls 117-1, 117-2 comprise additional hollow chambers 1505-1, 1505-2, 1505-3, 1505-4, 1507-1, 1507-2, 1507-3, 1507-4. The section plane of the drawing is disposed transversely to the longitudinal direction of the hollow channels 107. The height of the rectilinear webs 1509 defines the distance between the base wall 1101 and the cover wall 1103. The bent sections 1501-1, 1501-2, 1501-3, 1501-4 can be pulled apart to achieve a planar battery holder 100. In particular the example shown in FIG. 15 is the extruded form of the battery holder 100. In a further process step, the extruded form of the battery holder 100 can be pulled apart to yield the planar profile wall 103 according to the example shown in FIG. 16.

Figure 16:
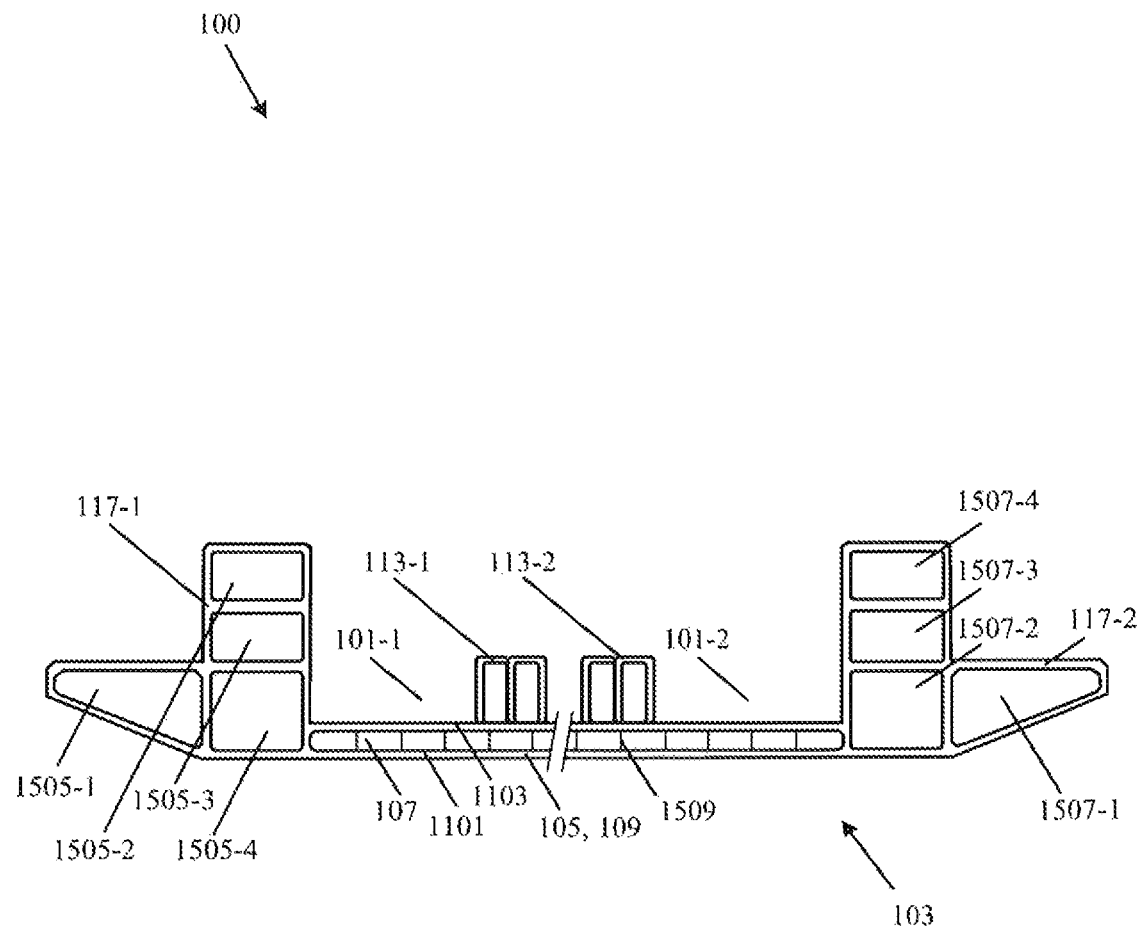
FIG. 16 shows the profile wall in an example.

FIG. 16 shows a cross sectional view of a schematic drawing of the profile wall 103 of the battery holder 100 with a heat exchanger 105. The hollow channels 107 are in each case disposed between the base wall 1101 and the cover wall 1103 of the base plate 109. The hollow channels 107 comprise a rectangular cross sectional area. The hollow channels 107 are separated by rectilinear webs 1509 which connect the base wall 1101 and the cover wall 1103.

The battery holder 100 comprises a plurality of juxtaposed module receptacles 101-1, 101-2 which are connected to the cover wall 1103 of the profile wall 103. Each module receptacle 101-1, 101-2 is provided for the receiving of a battery module. The module receptacles 101-1, 101-2 are separated from each other by separating walls 113-1, 113-2.

The separating walls 113-1, 113-2 are integrally attached to the cover wall 1103 of the base plate 109 in the extension direction of the hollow channels 107. The side walls 117 1, 117-2 comprise additional hollow chambers 1505-1, 1505-2, 1505-3, 1505-4, 1507 1, 1507-2, 1507-3, 1507-4. The section plane of the drawing is disposed transversely to the longitudinal direction of the hollow channels 107.

What is claimed is:

1. A battery holder for receiving a plurality of battery modules in an electrically driven vehicle, comprising:
   a plurality of juxtaposed module receptacles, wherein each module receptacle is configured to receive a battery module of the plurality of battery modules; and
   a profile wall that defines the plurality of juxtaposed module receptacles, wherein a heat exchanger configured to temper the plurality of battery modules is formed in the profile wall, wherein the heat exchanger comprises a plurality of hollow channels that extend along the plurality of juxtaposed module receptacles,
   wherein the plurality of juxtaposed module receptacles are separated from each other by walls and either form one or more of insertion cavities, recesses, receiving spaces, or a combination thereof for the plurality of battery modules,
   wherein the profile wall is integrally formed as an extrusion profile,
   wherein the profile wall comprises lateral hollow channel openings, wherein two opposing hollow channel openings respectively define one hollow channel, and wherein the lateral hollow channel openings of adjacent hollow channels are fluidly connected to each other in series or in parallel, in a fluid-tight manner,
   wherein the lateral hollow channel openings of the adjacent hollow channels are each connected by a fluid-carrying connection to fluidly connect the adjacent hollow channels in series or in parallel, and
   wherein the fluid-carrying connection is formed by a fluid-carrying pipe coupling, wherein the fluid-carrying pipe coupling comprises two fluid-carrying plug-in fittings that are connected in a fluid-tight manner, wherein each plug-in fitting is connected with a hollow channel opening in a plug-in or force-locking manner.

2. The battery holder according to claim 1, wherein the plurality of hollow channels are formed as hollow chambers in the profile wall.

3. The battery holder according to claim 1, wherein the battery holder comprises a central fluid distributor configured to feed multiple hollow chambers in parallel with fluid, wherein the central fluid distributor comprises a central feeder with one end connected in parallel with the plurality of hollow channels, and wherein the central fluid distributor comprises a central discharge connected in parallel with opposing ends of the plurality of hollow channels.

4. The battery holder according to claim 1, wherein the plurality of hollow channels are configured for conduction of a fluid.

5. The battery holder according to claim 1, wherein the heat exchanger comprises an integral meandering pipe that extends through the plurality of hollow channels and is configured for conduction of a fluid.

6. The battery holder according to claim 5, wherein in each hollow channel, a respective pipe support is formed and configured to support a meandering pipe section that extends through a respective hollow channel.

7. The battery holder according to claim 1, wherein hollow channels of the plurality of hollow channels extend parallel to one another.

8. The battery holder according to claim 1, wherein the plurality of hollow channels comprise a circular cross section and are extruded in the profile wall.

9. The battery holder according to claim 1, wherein the profile wall comprises a base plate and wherein hollow channels of the plurality of hollow channels are disposed at a distance from one another on the base plate or below the base plate, or wherein the profile wall comprises the base plate and a cover plate, wherein hollow channels of the plurality of hollow channels are displaced between the base plate and the cover plate.

10. The battery holder according to claim 9, wherein the hollow channels extend at a distance from one another on the base plate, and wherein base plate sections of the base plate between adjacent hollow channels form bent portions for a bend of the profile wall.

11. The battery holder according to claim 1, wherein the heat exchanger forms a vaporizer.

12. The battery holder according to claim 1, wherein adjacent battery modules or module receptacles are separated from each other by a separating web.

13. The battery holder according to claim 1, wherein the profile wall forms a base of the battery holder or a side wall of the battery holder.

14. The battery holder according to claim 1, wherein the plurality of hollow channels comprise elastically deformable vertical walls.

* * * * *